US009008118B2

(12) United States Patent
Han et al.

(10) Patent No.: US 9,008,118 B2
(45) Date of Patent: Apr. 14, 2015

(54) MULTICAST DATA DELIVERY OVER MIXED MULTICAST AND NON-MULTICAST NETWORKS

(75) Inventors: Yongkui Han, Westford, MA (US); Heidi Ou, Saratoga, CA (US)

(73) Assignee: Cisco Technology, Inc., San Jose, CA (US)

( * ) Notice: Subject to any disclaimer, the term of this patent is extended or adjusted under 35 U.S.C. 154(b) by 226 days.

(21) Appl. No.: 13/473,995

(22) Filed: May 17, 2012

(65) Prior Publication Data

US 2013/0308637 A1    Nov. 21, 2013

(51) Int. Cl.
| | |
|---|---|
| *H04J 3/16* | (2006.01) |
| *H04J 3/22* | (2006.01) |
| *H04L 12/28* | (2006.01) |
| *H04L 12/56* | (2006.01) |
| *H04J 3/26* | (2006.01) |
| *H04N 21/6405* | (2011.01) |
| *H04L 12/18* | (2006.01) |

(52) U.S. Cl.
CPC .......... *H04N 21/6405* (2013.01); *H04L 12/184* (2013.01)

(58) Field of Classification Search
CPC .......... H04N 21/6405; H04N 21/5406; H04N 21/64; H04N 21/63; H04L 12/18; H04L 12/184; H04L 45/16; H04L 49/203; H04L 49/20; H04L 12/185; H04L 45/00
USPC .......... 370/432, 392, 466, 389, 390; 709/223, 709/227
See application file for complete search history.

(56) References Cited

U.S. PATENT DOCUMENTS

| | | | |
|---|---|---|---|
| 6,563,832 B1 | 5/2003 | Stuart et al. | |
| 6,657,951 B1 | 12/2003 | Carroll et al. | |
| 6,674,727 B1 | 1/2004 | Carroll et al. | |
| 6,704,318 B1 | 3/2004 | Stuart et al. | |
| 7,477,282 B2 * | 1/2009 | Firestone et al. | 348/14.09 |
| 8,130,643 B2 * | 3/2012 | Dattagupta et al. | 370/230 |
| 2003/0126514 A1 * | 7/2003 | Shabbir Alam et al. | 714/43 |
| 2005/0078171 A1 * | 4/2005 | Firestone et al. | 348/14.08 |
| 2011/0188499 A1 | 8/2011 | Wijnands et al. | |
| 2011/0255458 A1 * | 10/2011 | Chen et al. | 370/312 |
| 2011/0286470 A1 | 11/2011 | Dec et al. | |
| 2013/0018993 A1 | 1/2013 | Hui et al. | |
| 2013/0308637 A1 * | 11/2013 | Han et al. | 370/390 |

OTHER PUBLICATIONS

"Cisco Nexus 7000 Series NX-OS OTV Configuration Guide", Text Part No. OL-25756-01, Cisco Systems, Inc., San Jose, California, Jul. 6, 2010, 68 pages.

* cited by examiner

*Primary Examiner* — Kwang B Yao
*Assistant Examiner* — Adam Duda
(74) *Attorney, Agent, or Firm* — Parker Ibrahim & Berg LLC; James M. Behmke; Stephen D. LeBarron

(57) ABSTRACT

In one embodiment, a relay device of a network, which is reachable by a source device via only a non-multicast network, receives a non-multicast that encapsulates a multicast message. The relay device is connected to a sub-network of one or more devices. The relay device decapsulates the unicast message to determine the multicast message, re-encapsulates the multicast message as a relay-sourced multicast message, and multicasts the relay-sourced multicast message to the one or more devices within the sub-network.

8 Claims, 21 Drawing Sheets

MULTICAST DATA DELIVERY OVER MIXED MULTICAST AND NON-MULTICAST NETWORKS

TECHNICAL FIELD

The present disclosure relates generally to computer networks, and, more particularly, to multicast data delivery over mixed multicast and non-multicast networks.

BACKGROUND

Network technologies such as Overlay Transport Virtualization (OTV) connect geographically dispersed data centers across networks to balance resource workload without affecting the stability of the overall network. These networks typically include unicast core networks or multicast core networks. Unicast core networks connect resources using a unicast protocol that is a one-to-one communication to forward data packets (e.g., Internet Protocol (IP) packets) from a sending node to a receiving node. Unicast packets are sent from a single sending node to a single destination node. In sending unicast packets from the sending node to the destination node, unicast packets might pass through other devices as they are transmitted across the network. In contrast, multicast core networks connect data center recourse using multicast protocol that is a one-to-many communication of IP packets between one node and multiple nodes, which elect to participate in a specific multicast group. Multicast communication can be used for multiple-user multimedia applications such video conferencing, distance learning, and collaborative computing.

When data centers connect and communicate from a multicast core network across a unicast core network, data packets sent from the multicast core must be replicated for each destination node in the unicast core. For example, using an Adjacency Server (AS) mechanism, an adjacency server (e.g., an OTV edge device) maintains overlay adjacency information, and informs other edge devices of this information, accordingly. For each multicast delivery group, a unicast replication list is constructed and maintained by each edge device, so multicast traffic can be delivered to all receivers over non-multicast IP network as a collection of unicast messages. As such, this results in an increase in network traffic to transmit redundant data packets.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a relay device of a computer network may receive a unicast message that encapsulates a multicast message, where the relay device is reachable by a source device over only a non-multicast network, and, further, is connected to a sub-network of one or more devices. The relay device may decapsulate the unicast message to determine the multicast message, and then may re-encapsulate the multicast message as a relay-sourced multicast message to multicast the relay-sourced multicast message to the one or more devices within the sub-network.

According to one or more additional embodiments, a root device may determine a reachability of one or more relay devices via only a non-multicast network. The root device further encapsulates a multicast message as a unicast message, and transmits the unicast message to each of the one or more relay devices over the non-multicast network according to the reachability. In turn, this causes each relay device to decapsulate the unicast message to obtain the multicast message, re-encapsulate the multicast message as a relay-sourced multicast message, and multicast the relay-sourced multicast message to the one or more devices of the sub-network of the particular relay device.

Description

A computer network comprises geographically distributed nodes (e.g., devices of a distributed data center or end-client devices such as personal computers and workstations, or other devices) interconnected by communication links for transporting data between end nodes. Various types of network are available and can include, for example, local area networks (LANs), wide area networks (WANs), etc. In addition, each of these various types of networks can support various communication technologies such as multicast, and non-multicast (e.g., unicast) communication. Each of these networks can connect the nodes over dedicated private communication links, or dispersed nodes over long-distance communications links such as common carrier telephone lines, optical lightpaths, synchronous optical networks (SONET), synchronous digital hierarchy (SDH) links, and others.

Figure 1:
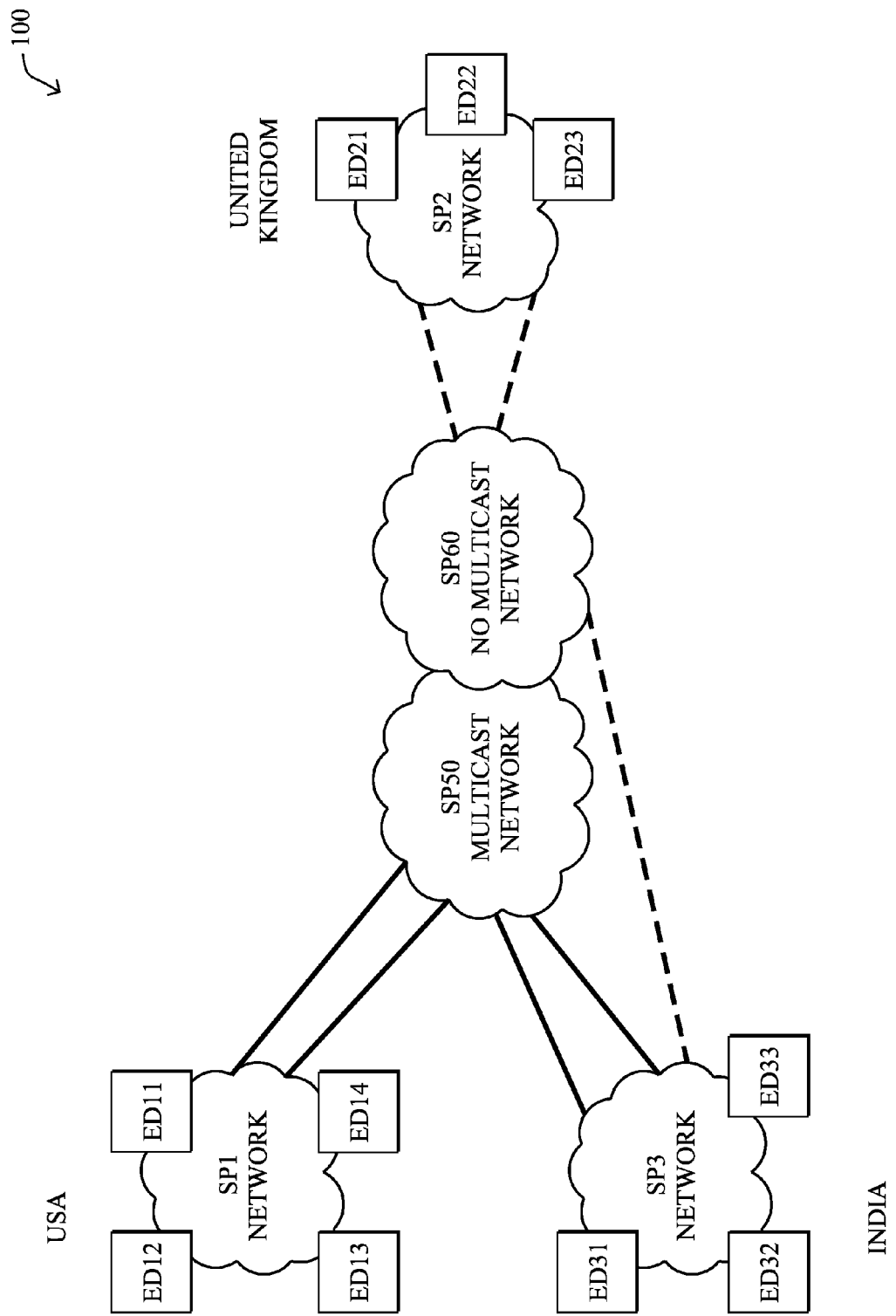
FIG. 1 illustrates an example mixed communication network including non-multicast and multicast networks.

FIG. 1 is a schematic block diagram of an example mixed communication network 100 including non-multicast (e.g., unicast) and multicast networks comprising nodes/devices (e.g., edge devices or "ED" 11-14, 21-23, and 31-33) interconnected by various methods of communication. For example, mixed communication network 100 may comprise service provider networks such as SP1, SP2, SP3, SP50, and SP60, which comprise multicast and non-multicast networks (e.g., unicast networks). Illustratively, ED11-ED14 communicate in the SP1 network (e.g., located in the USA), ED 21-23 communicate in the SP2 network (e.g., located in the United Kingdom), and ED31-33 communicate in the SP3 network (e.g., located in India). The SP50 and SP60 networks are transit networks that provide for communication between devices in the SP1, SP2, and SP3 networks, where, illustratively, SP50 is a multicast network, and SP60 is a non-multicast (e.g., unicast) network.

In particular, each of the devices can communicate with other devices via the networks using predefined network communication protocols as will be appreciated by those skilled in the art, such as various non-multicast (e.g., unicast) protocols, multicast protocols, wired protocols, wireless protocols etc., where appropriate. In this context, a protocol consists of a set of rules defining how the nodes interact with each other.

Those skilled in the art will understand that any number of nodes, devices, links, etc. may be used in the computer network, and that the view shown herein is for simplicity. Further, although the devices within each service provider network are illustrated as edge devices (EDs), the devices may also comprise hardware such as servers, communication hardware (e.g., routers, switches, etc.), computers, and client devices. In addition, each of the devices may act as a relay device or a root device, as described below.

Figure 2:
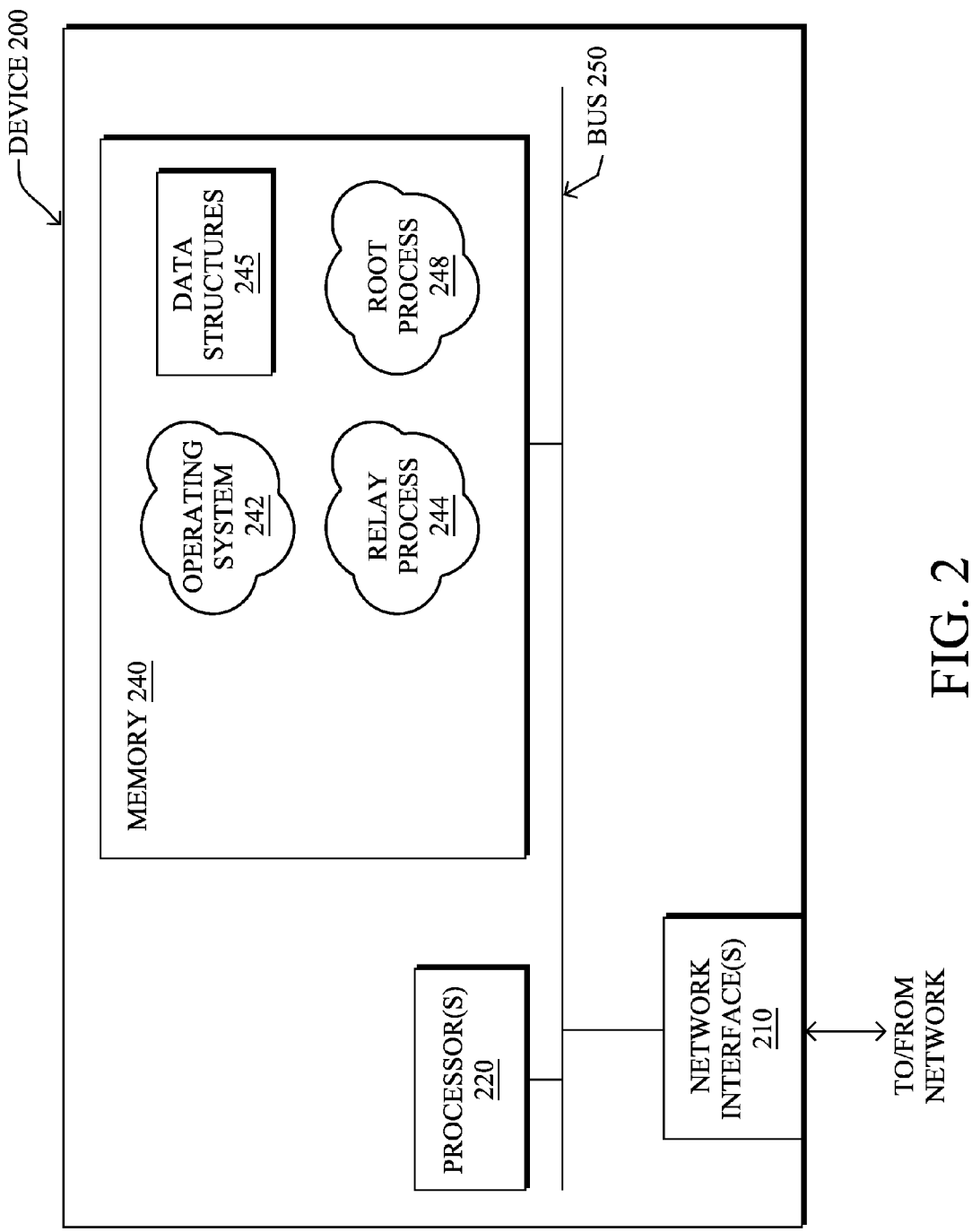
FIG. 2 illustrates an example network device/node.

FIG. 2 is a schematic block diagram of a simplified example device 200 that may be used with one or more embodiments described herein. For example, example device 200 can be any of the "edge devices" (EDs) shown in FIG. 1, and can include a root device or relay device (e.g., a data center, a virtual machine, or an edge computing device). Device 200 may comprise one or more network interfaces 210 (e.g., wired, wireless, etc.), at least one processor 220, and a memory 240 interconnected by a system bus 250.

The network interface(s) 210 comprise the mechanical, electrical, and signaling circuitry for communicating data over network 100. Network interfaces 210 may be configured to transmit and/or receive data using a variety of different communication protocols. Note that each device may include two different types of network connections 210, e.g., wireless and wired/physical connections, and that the view herein is merely for illustration.

Memory 240 comprises a plurality of storage locations that are addressable by the processor 220 and the network interfaces 210 for storing software programs and data structures associated with the embodiments described herein. Processor 220 may comprise hardware elements or hardware logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise relay process/services 244, and a root process 248, as described herein. Note that while processes 244 and 248 are shown in centralized memory 240, additional embodiments provide for either of the processes to be specifically operated within the network interfaces 210.

Note further that while both processes 244 and 248 are shown as installed in a memory 240, and therefore being implemented in software, these processes could be implemented in any of hardware (e.g., electronic circuitry), firmware, software, or a combination thereof. Alternatively, these processes may be configured on a storage medium for subsequent loading into memory 240. The storage medium can include a computer-readable medium encoded with a computer program, and can be any conventional storage medium that stores the processes thereon in tangible form. Examples of storage media include a floppy disk, a compact disk, a magnetic tape, a read only memory, an optical storage media, universal serial bus (USB) flash drive, etc. Alternatively, storage media can include a random access memory, or other type of electronic storage, located on a remote storage system and coupled to processor 220, via network interface 210.

As will be apparent to those skilled in the art other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

As noted above, when devices communicate between mixed multicast and non-multicast networks, data packets sent from the multicast network are replicated for each destination node in the non-multicast network, which results in an increase in network traffic despite the redundancy of data packets. For example, with reference to FIG. 1, messages sent between SP1 (or SP3) and SP2 may traverse mixed transit networks SP50 (e.g., multicast) and SP60 (non-multicast). In addition, particular devices within SP2 (e.g., ED21-23) are only non-multicast reachable from any sources within SP1 and SP3. As a result, when the devices (e.g., ED11) send a packet (e.g., an intermediate system to intermediate system (IS-IS) control packet) to certain devices within SP2 (e.g., ED21-23) using multicast transmission separate messages (copies) must currently be sent over the non-multicast network. Moreover, should any device within SP2 communicate a multicast message outside of its own network (e.g., to ED11-14 and ED31-33), a separate message must be sent to each destination endpoint, including those within its own network SP2 (e.g., ED22-23), such that nine total unicast messages are sent (seven over the non-multicast network).

Accordingly, the techniques described herein reduce this redundant traffic transmission and optimize efficient communication across mixed networks. As described herein, that is, the techniques provide for optimizing delivery of messages over mixed networks via multicast communication. In particular, in one or more specific embodiments, the techniques illustratively provide for an OTV extension, used in conjunction with root and relay processes/services to achieve optimal delivery in such scenarios. Notably, OTV, which generally connects separated data-center islands over packet switched networks, is described in an Internet Draft of the Internet Engineering Task Force (IETF), entitled "Overlay Transport Virtualization", draft-hasmit-otv-03> by Grover et al. (July 2011 edition), the contents of which are incorporated by reference in their entirety.

Illustratively, the techniques described herein may be performed by hardware, software, and/or firmware, such as in accordance with the relay process 244, and the root process 248, which may each comprise computer executable instructions executed by processor 220 to perform functions relating to the techniques described herein, particularly based on whether the device is acting as a root device or a relay device. Notably, relay process 248 and root process 244 may simply be a single process 244/248 configured to operate in the presence of mixed multicast and non-multicast networks (e.g., as merely a "multicast" process), and the view shown here is merely for purposes of discussion.

Operationally, under the control of root process 248, a device can act as a root device (e.g., ED11). According to root process 248, the root device determines a reachability of one or more relay devices via only a non-multicast network (e.g., ED21-23 of SP2 over SP60). Each relay device of the one or more relay devices communicates with a sub-network of one or more devices (e.g., ED22 communicates with one or more endpoint devices, such as consumer/subscriber devices, not shown for clarity). The root device further encapsulates a multicast message as a unicast message (e.g., using an OTV relay bit in a header of the unicast message), and transmits each unicast message to the one or more relay devices over the non-multicast network according to the reachability to cause each relay device to decapsulate the unicast message to obtain the multicast message, re-encapsulate the multicast message as a relay-sourced multicast message, and multicast the relay-sourced multicast message to the one or more devices of the sub-network of the particular relay device.

Moreover, under the control of relay process 244, a device (e.g., ED22) of a network 100, which is reachable by a source device (e.g., ED11) via only a non-multicast network (e.g., SP60), receives a non-multicast message (e.g., a unicast message) that encapsulates a multicast message. The device acts as a relay device and is further connected to a sub-network of one or more devices. The relay device further decapsulates the unicast message to determine the multicast message, re-encapsulating the multicast message as a relay-sourced (e.g., device-sourced) multicast message, and multicasts the relay-sourced multicast message to the one or more devices within the sub-network.

In one or more embodiments of the techniques herein, when the root device determines the reachability of the one or more relay devices, the root device generates a multicast reachability database (MRDB) that stores the reachability of the one or more relay devices via only a non-multicast network, and generates a multicast distribution tree (MDT) based on the MRDB. The MDT indicates devices (e.g., ED22) that are only non-multicast reachable from the root device. In addition, when the root device transmits the unicast message, the root device transmits each unicast message to the one or more relay devices according to the multicast distribution tree.

Figure 3:
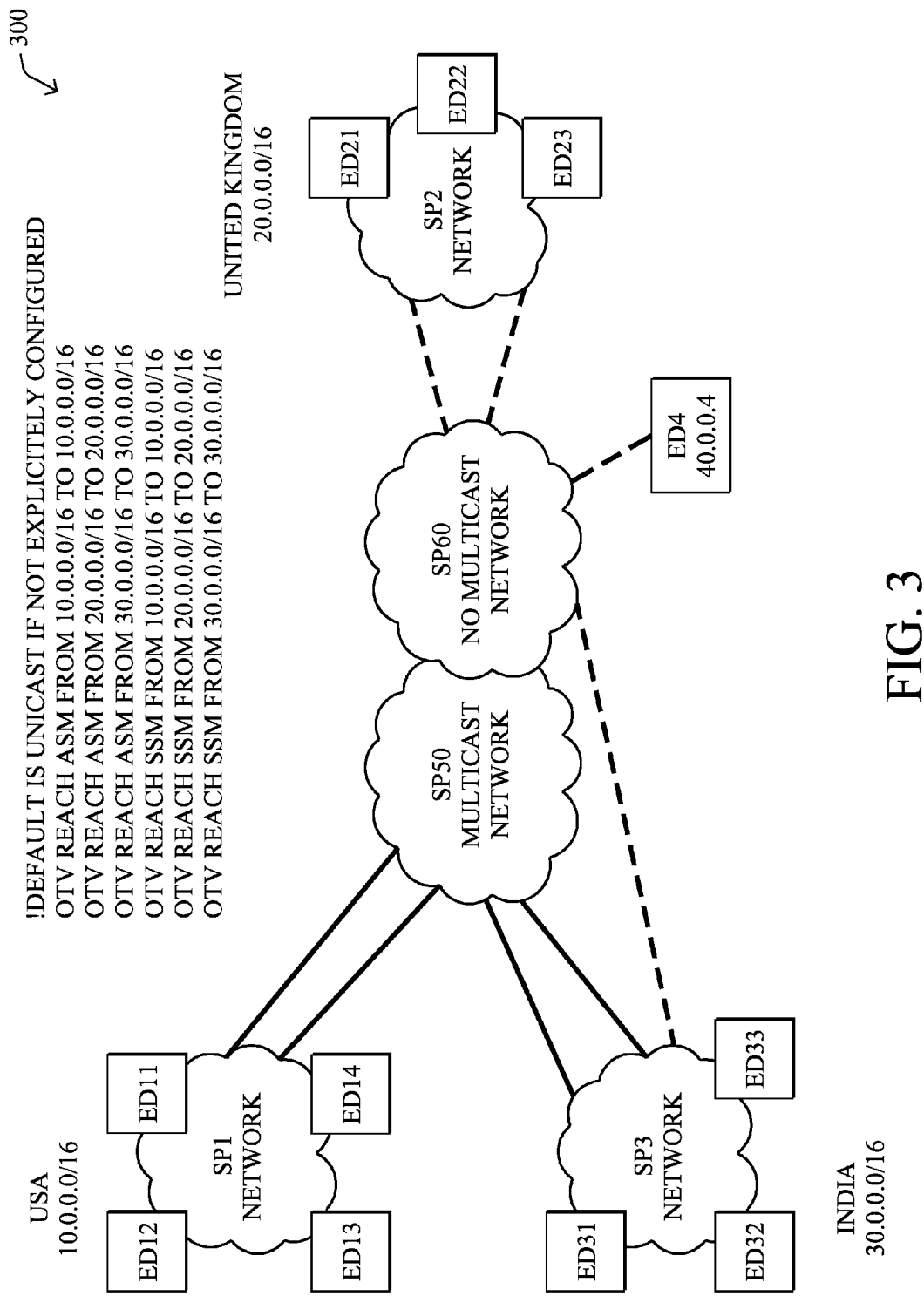
FIG. 3 illustrates an example view of the communication networks with respect to establishing a reachability profile.

For example, FIG. 3 provides an example view of the mixed communication networks with respect to establishing a reachability profile, which is used to maintain a multicast reachability database for each source device.

According to FIG. 3, each source device can create a reachability profile by defining relative multicast or non-multicast communication (e.g., transmission and receipt) of messages from the source device to receiving devices. For example, source devices within SP1 network can use transmission-control protocol/Internet Protocol (TCP/IP) routing to define the communication type (multicast or non-multicast) from 10.0.0.0/16 to 20.0.0.0/16. This can be replicated for each device within respective service provider networks. In addition, the multicast transmission type can further include, but is not limited to, any source multicast (ASM) or specific source multicast (SSM). This reachability is typically stored by the source device as a multicast reachability database (MRDB), from which a multicast distribution tree can be determined, each as described in greater detail below. Note that the reachability database can be command line configured or dynamically created, as may be appreciated by those skilled in the art.

For example, the following command line input can be used to configure the reachability between devices (e.g., EDs):

otv reach {asm\ssm\unicast} from <ed-ip-prefix> to <ed-ip-prefix> for <dg-ip-prefix> where ed-ip-prefix is a unicast IP range, and dg-ip-prefix is a multicast IP range. If no explicitly configured reachability exists between devices, for example, Device1 and Device2, the default assumes non-multicast reachability (e.g., unicast reachability). Moreover, in some embodiments, an adjacency server can be provided to store the reachability (e.g., a reach-profile), to avoid configuring each device. The devices can obtain the reachability information from the adjacency server. Furthermore, storing the reach-profile in an adjacency server can also guarantee that the reachability profile is consistent among all devices. For example, this reach-profile can configured according to a command line input as follows:

otv reach-profile from-adjacency-server <as-ip> where <as-ip> is the unicast IP address of the adjacency server.

With respect to reachability, the reachability may be determined according to generally known principles of multicast or non-multicast transmission. For example, with reference to FIG. 3, if ED1 can "reach" (e.g., communicate with) ED2 via ASM, then ED1 and ED2 typically share a same control-group address (e.g., via Internet Group Management Protocol (IGMP)). Thus, if ED1 transmits a message to the group, ED2 should receive the message. For example, multicast can be represented as ("Source", "Group") or (S,G). Accordingly, ED2 can receive messages from any source (e.g., "*") from a provider multicast group (pMG), which can be represented as (*, pMG). However, when ED1 communicates with ED2 via specific source multicast (SSM), which can be represented as (ED1, G), ED1 uses a special channel (e.g., for IS-IS control traffic and broadcast traffic). SSM communication occurs when ED2 joins the group (e.g., the special channel) of ED1, and can be configured according to command lines inputs such as: "otv reach ssm from ED1 to ED2 for G". Generally, for ED2 to receive messages (e.g., IS-IS control traffic and broadcast traffic) from other devices (e.g., EDi), ED2 must also join respective channels (EDi, G). Moreover, as discussed above, any SSM communication reachability between respective devices can be reported to the adjacency server, which can then distribute the information to all other devices. Notably, ASM reachability is generally symmetric and, if a disparity is detected (e.g., by one of the devices) an error message may be reported to an administrator. However, SSM reachability is not symmetric and allows for "otv reach ssm from ED1 to ED2"=true, while "otv reach ssm from ED2 to ED1"=false. In addition, if ED2 can receive traffic from ED1 via both (ASM, pMG) and (SSM, G), then ED2 will typically use (ASM, pMG). That is, ED2 will not join the special ssm (ED1, G) channel. Accordingly, if ED1 has some devices that receive traffic via (ASM, pMG), and other devices that only receive traffic via (SSM, G), then ED1 will send one packet to (ASM, pMG) and one packet to SSM (ED1,G) channel.

In some embodiments, configuration consistency and conflicts are checked. In particular, configuration consistency and conflict checks may be performed to guarantee proper optimization of communication (e.g., checking for duplication of devices for with reachability via both multicast and unicast with respect to a source device). For example, for ASM, the configured control group (e.g., pMG) should be the same amongst devices:

"otv reach asm from ED1 to ED2 for G" and "otv reach ssm from ED1 to ED2 for G" can both be true, but not with "otv reach unicast from ED1 to ED2 for G".

In sum, the reachability information is configured for each device and stored as a multicast reachability database (MRDB). The MRDB is a table with entries such as:

ED(i) unicast-ip pMG special-ssm-g asm\ssm\unicast

From the MRDB configured and stored for each device, a multicast distribution tree (MDT) is determined.

Figure 4A:
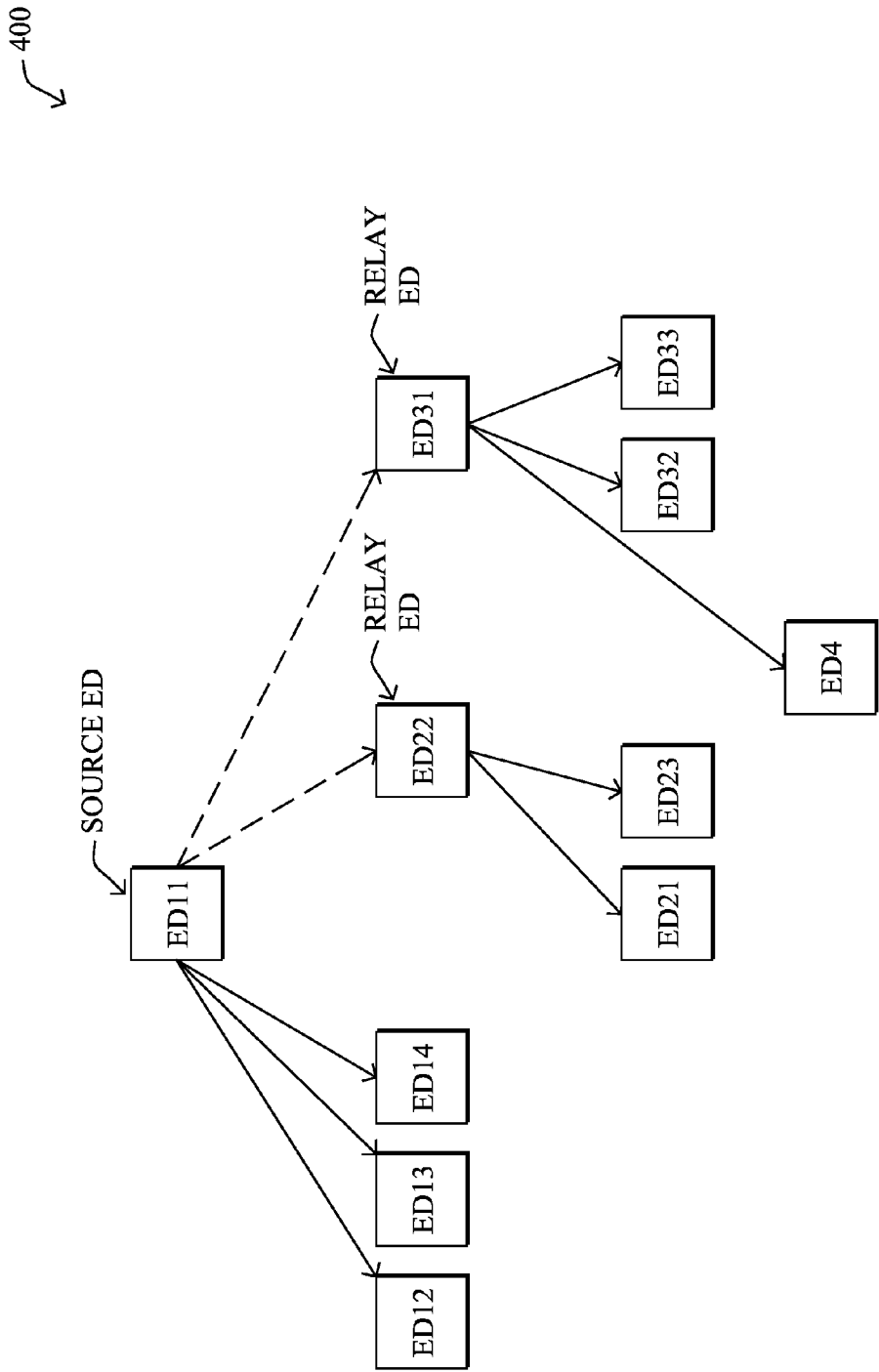
FIGS. 4A-4C illustrate examples of various multicast distribution trees (MDT)
Figure 4B:
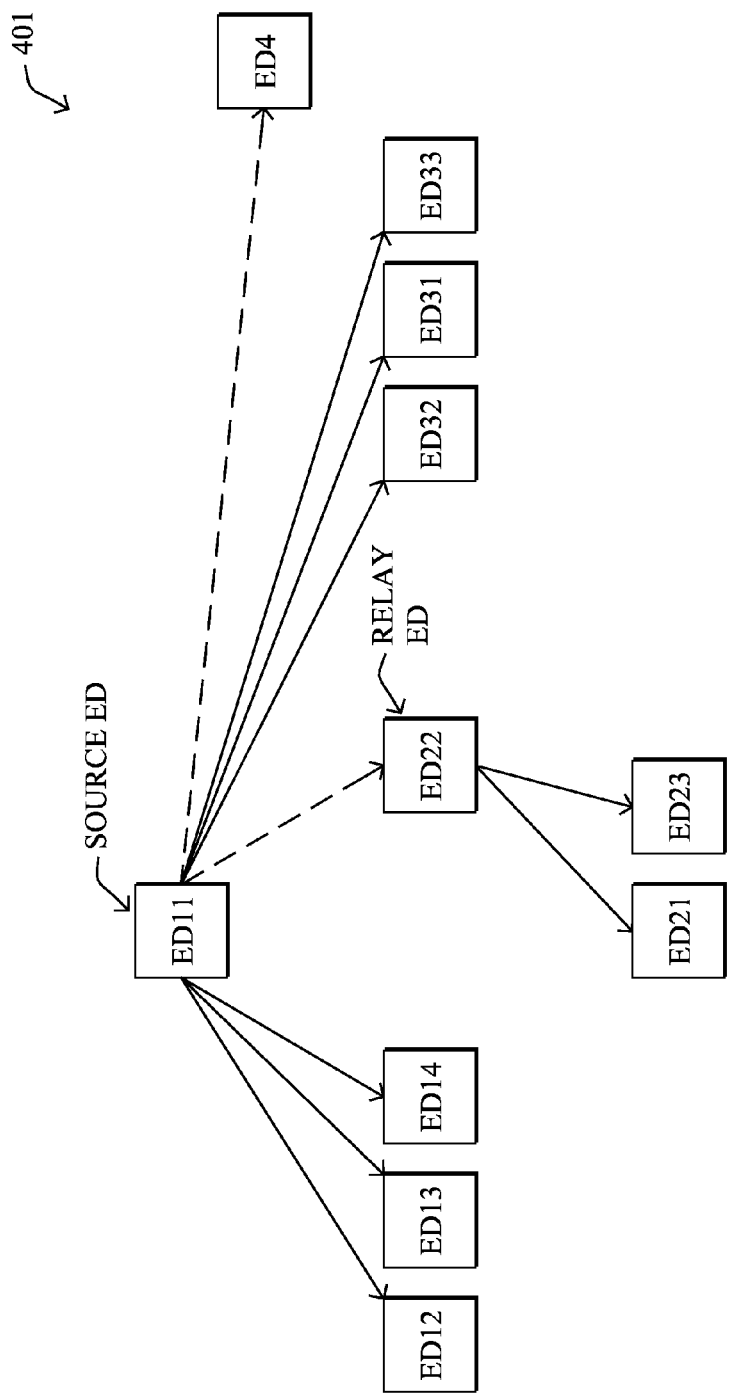
Figure 4C:
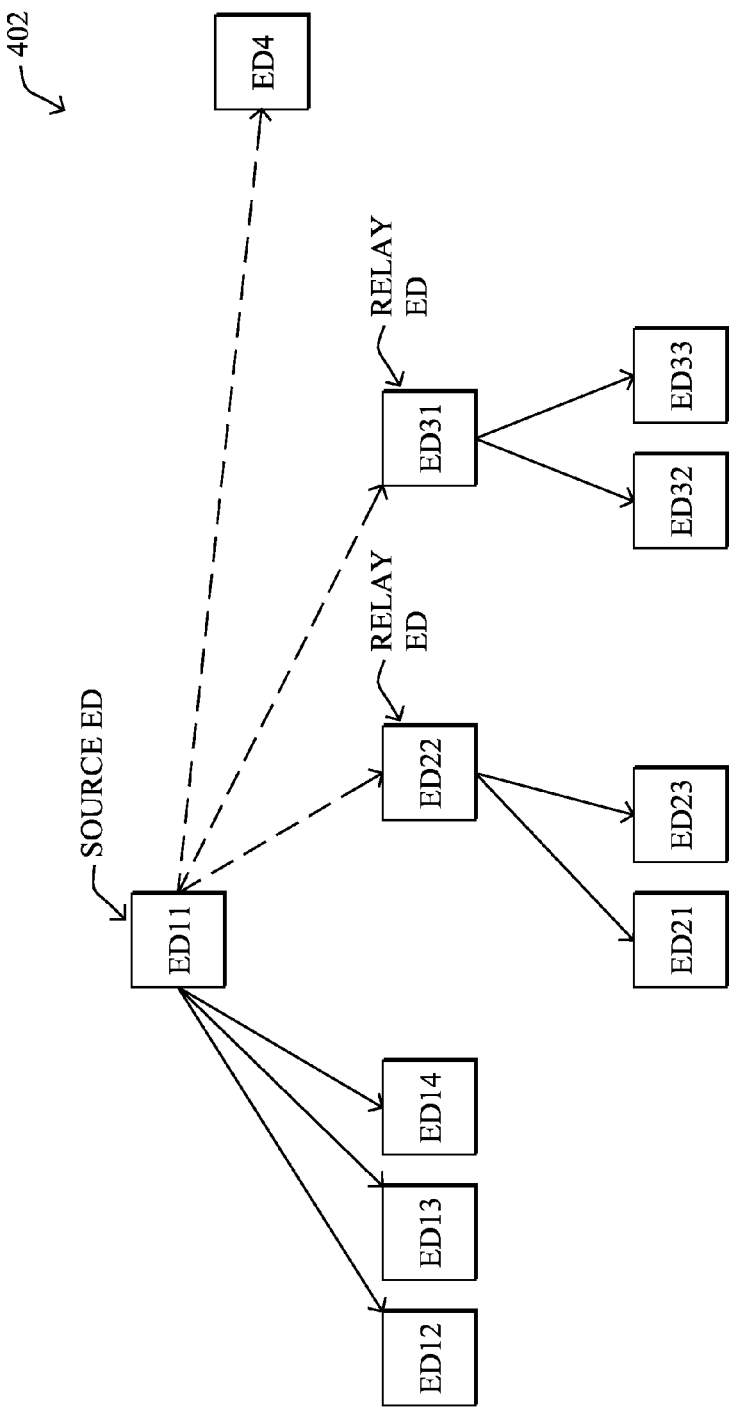

FIGS. 4A-4C illustrate examples of various multicast distribution trees (MDT) for devices displayed in FIG. 3. In particular, FIGS. 4A-4C illustrate determining, relative to a root device, a reachability of one or more relay devices via only a non-multicast network. Typically, each relay device of the one or more relay devices communicates with a sub-network of one or more devices. Notably, for each of FIGS. 4A-4C, multicast transmission is represented by a solid line and non-multicast transmission is represented by a dashed line. As discussed above, the reachability of devices with respect to a source device is typically stored by the source device in a multicast reachability database (MRDB). As discussed in greater detail below, the multicast distribution tree (s) can be determined from the MRDB. Note again that the MRDB can be command line configured or dynamically created.

To create each MDT at a respective device, the device first establishes itself as a source or root device. Next, additional devices that are multicast reachable from the source device are added to the tree. Subsequently, a first device that is only non-multicast reachable from the source is added and may be designated as a "relay device." (Note that in general, a "relay device" may imply any device configured to relay multicast transmissions to further downstream devices, or else, as used in the example herein, may instead imply only those devices that are only non-multicast reachable from the source.) Next, each device of a sub-network of devices that are multicast-reachable from this first relay device is added under the relay device. Any remaining devices that are only non-multicast reachable from the source may also be added and designated as additional relay devices in the same manner, until all of the devices within the networks are added to the MDT. Once all of the devices within the networks are added to the MDT, any 2nd-level leaf device that is contained within the sub-network need not be added since the source device will not directly send traffic to these devices.

Notably, if a destination device can communicate with a plurality of devices (e.g., relay devices or source devices), multiple MDTs can be created, and load-balancing can be performed to balance multicast traffic amongst the various paths of network traffic. That is, if there are multiple choices for a relay device, then multiple MDTs may be build, and used for load-balancing for different traffic flows.

For example, FIG. 4A provides a multicast distribution tree (MDT) 400 that includes ED11 as a source device, and ED22 and ED31 as relay devices. As discussed above, ED11 can treat ED22 and ED 31 as "relay" devices, since ED22 and ED31 can reach a sub-network of devices. In this fashion, ED11 can send a non-multicast message to ED22 (over non-multicast SP60 network) and the message can be distributed to subsequent sub-network devices (e.g., ED4, ED32, and ED33). Once all of the devices are added to MDT 400, the sub-network of devices may be deleted. However, for purposes of illustration, the sub-network of devices is still included. Accordingly, unnecessarily redundant transmission of duplicate messages to reach those other devices within the remote sub-networks is eliminated. In particular, according to MDT 400, ED11 can transmit a non-multicast message that encapsulates a multicast message to ED22, which causes ED22 to decapsulate the non-multicast message to determine the multicast message; re-encapsulate the multicast message as a relay-sourced multicast message (e.g., an ED22-sourced message), and multicast the relay-sourced multicast message to devices ED21 and ED23. This results in a reduction in messages since ED11 will not replicate messages for each of ED21 and ED22, since these devices receive multicast messages from ED22. The same reduction is available through relay device ED31 to reach ED32, ED33, and ED4. Notably, ED11 communicates directly with devices ED12, ED13, and ED14, which are within the SP1 network.

FIGS. 4B and 4C provide alternative multicast distribution trees MDT 401 and MDT 402, respectively, that illustrate how ED11, as a source device, may select different combinations of relay devices in order to create multiple MDTs for load-balancing purposes or otherwise. For instance, in MDT 401 of FIG. 4B, ED22 is a relay device that can reach a sub-network of devices (e.g., ED21, and ED22), but ED31 is not a relay device. Alternatively, FIG. 4C illustrates another MDT 402 where ED31 is a relay device for only ED32 and ED31, while ED4 is reached directly by source device ED11. Those skilled in the art will appreciate that any number of combinations may be created for different MDTs, and the views shown herein are merely examples.

Figure 5:
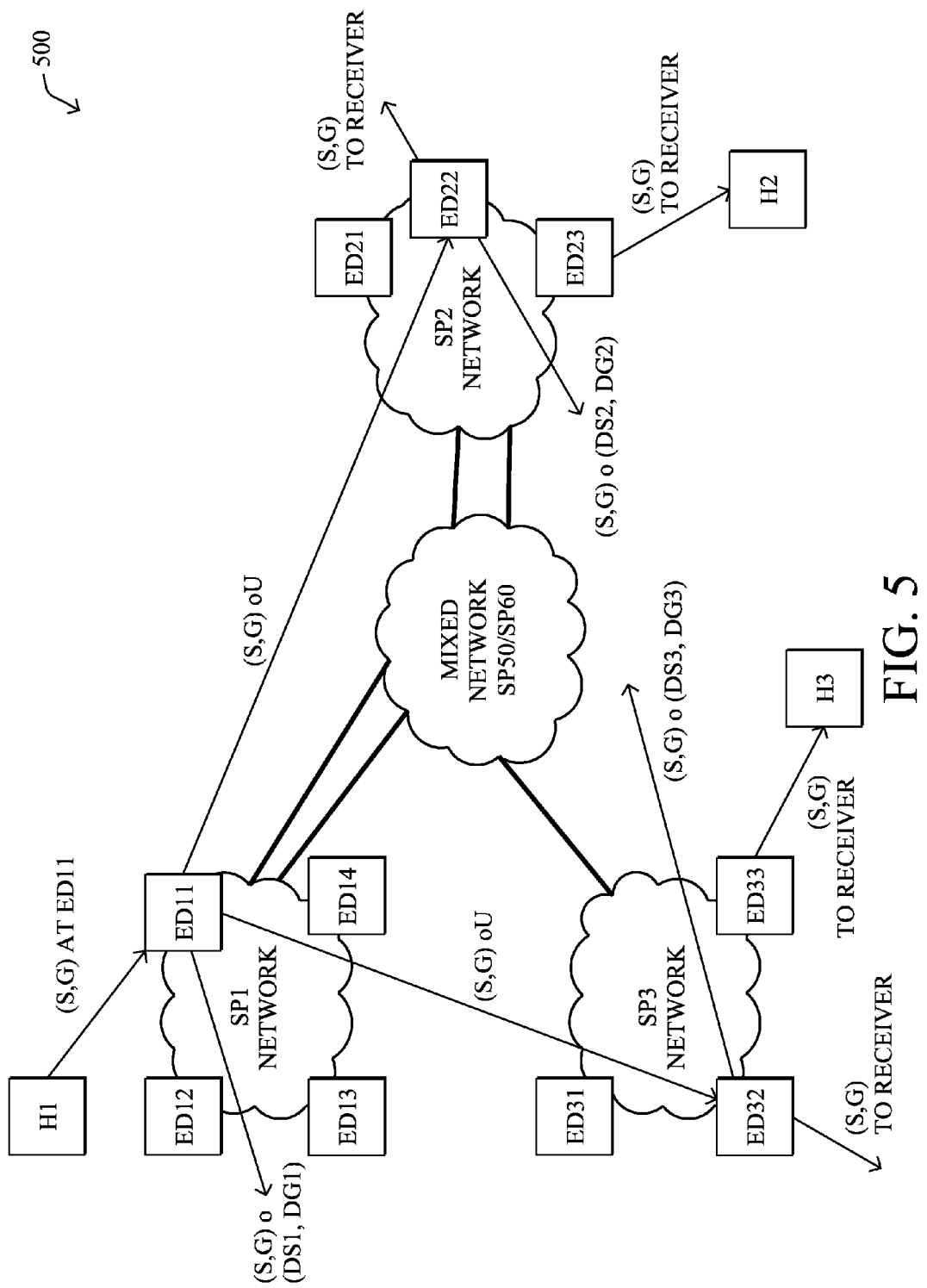
FIG. 5 illustrates an example of multicast communication across non-multicast networks.

FIG. 5 illustrates an example system (e.g., system 500) that provides multicast communication across non-multicast networks, and FIGS. 5A-5L provide examples of various stages of multicast communication across the non-multicast networks. FIGS. 5 and 5A-5L logically follow FIGS. 4A-4C and collectively illustrate the source (or root) device determining a reachability of one or more relay devices via a non-multicast network (with some relay devices having one or more sub-networks of devices). The root device encapsulating a multicast message as a unicast message (e.g., using an OTV relay bit in a header of the unicast message) and transmitting each unicast message to the one or more relay devices over the non-multicast network according to the reachability (e.g., the MDT). The relay device receives the message, decapsulates the unicast message to obtain the multicast message, re-encapsulates the multicast message as a relay-sourced multicast message, and multicasts the relay-sourced message to devices in respective sub-networks. Notably, for each of FIGS. 5A-5L, messages sent via multicast are represented as solid lines and messages via non-multicast are represented as a dashed line.

Referring specifically to system 500 of FIG. 5, various networks are provided. These networks include a SP1 network, a SP2 network, a SP3 network, and a mixed network (e.g., IP core network) SP50/SP60. SP1, SP2, and SP3 networks support multicast communication, while mixed network SP50/SP60 supports both multicast and non-multicast network communication. In particular the SP2 network, relative to the SP1 and SP3 networks, is reachable via only non-multicast communication. Each of networks SP1, SP2, and SP3 may include other devices (e.g., edge devices (EDi)), and some of the edge devices may be further connected to host devices (e.g., H1, H2, H3), such as various types of subscriber devices.

System 500 illustrates one embodiment of communicating a multicast message over a unicast network. In particular, ED11 is a source device (e.g., ED (S, G)), which receives messages from device H1. Device H2 joins the group G in the SP2 network to receive (S, G) messages. The message (e.g., an IS-IS packet) is delivered from a host (e.g., device H1) behind ED11 in SP1 network to another host device H2 behind ED23 in SP2 network over mixed network SP50/SP60 (e.g., encapsulated as (S, G) over Unicast (U), as noted above). As discussed above, messages from source ED11 can be sent to other devices via various communication methods (e.g., ASM multicast (*,G); SSM multicast (S, G); unicast). For example, if "otv reach asm from Device1 to Device2", the message is sent to the ASM group pMG; if "otv reach ssm from Device1 to Device2", the message is sent to the special SSM group G1; and, if "otv reach unicast from Device1 to Device2", the message is sent to the unicast IP address of Device2.

Figure 5A:
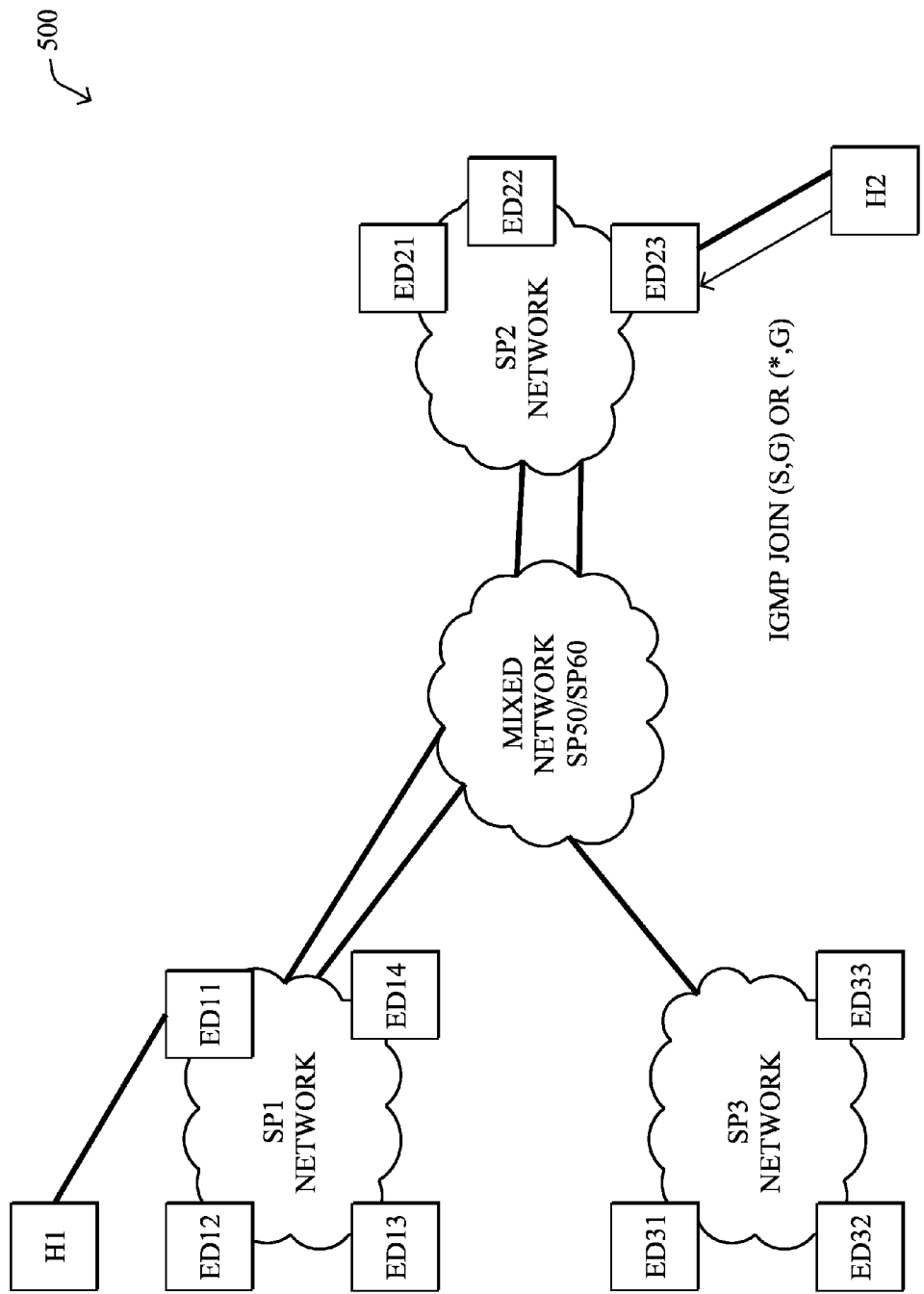
FIGS. 5A-5L illustrate various stages of multicast communication across non-multicast networks.
Figure 5B:
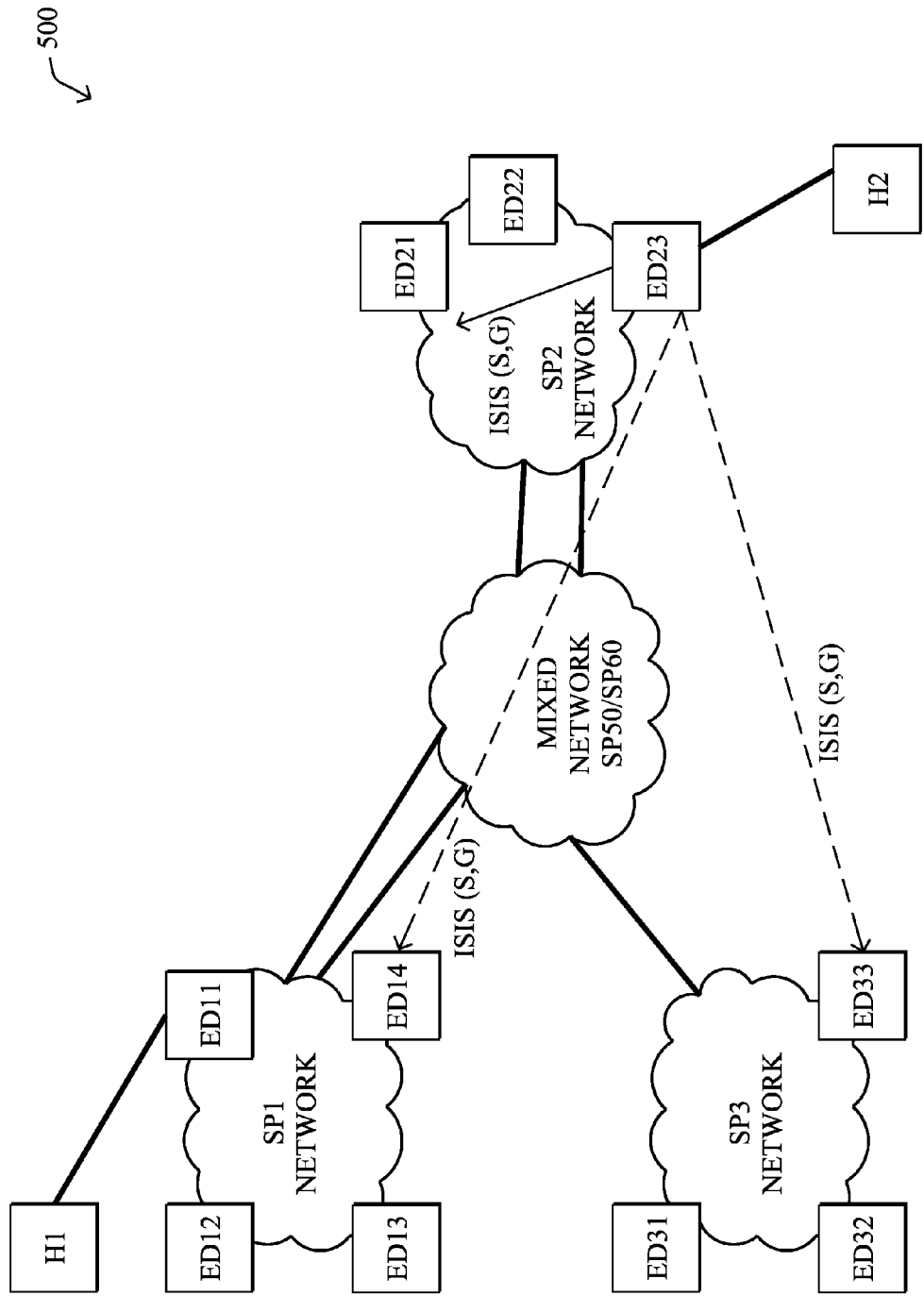
Figure 5C:
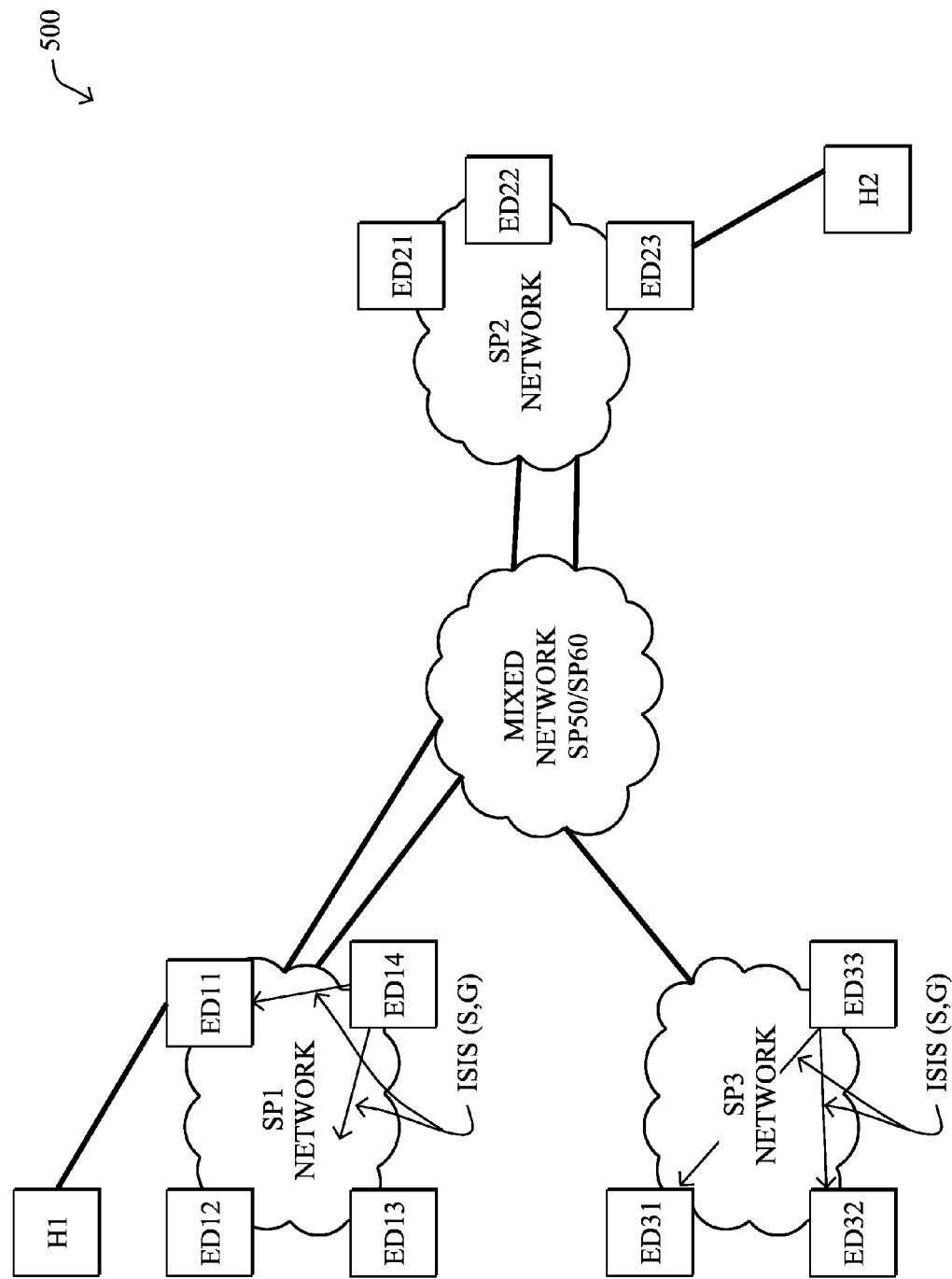

FIGS. 5A-5C illustrate generating a multicast distribution tree based on interested devices. For example, FIG. 5A illustrates device H2 sending a request to join the group G (e.g., via IGMP) at ED23; FIG. 5B illustrates ED23 advertising interest in the Group (e.g., IS-IS (S, G)) as an established label switched path (LSP) to other reachable EDi(s) (e.g., ED14 and ED 33); and FIG. 5C illustrates ED14 and ED33 propagating the advertised interest (the LSP) from ED23 to other respectively reachable EDi(s) (e.g., from ED33 to ED32 and ED31 and from ED14 to ED12 and ED11).

Figure 5D:
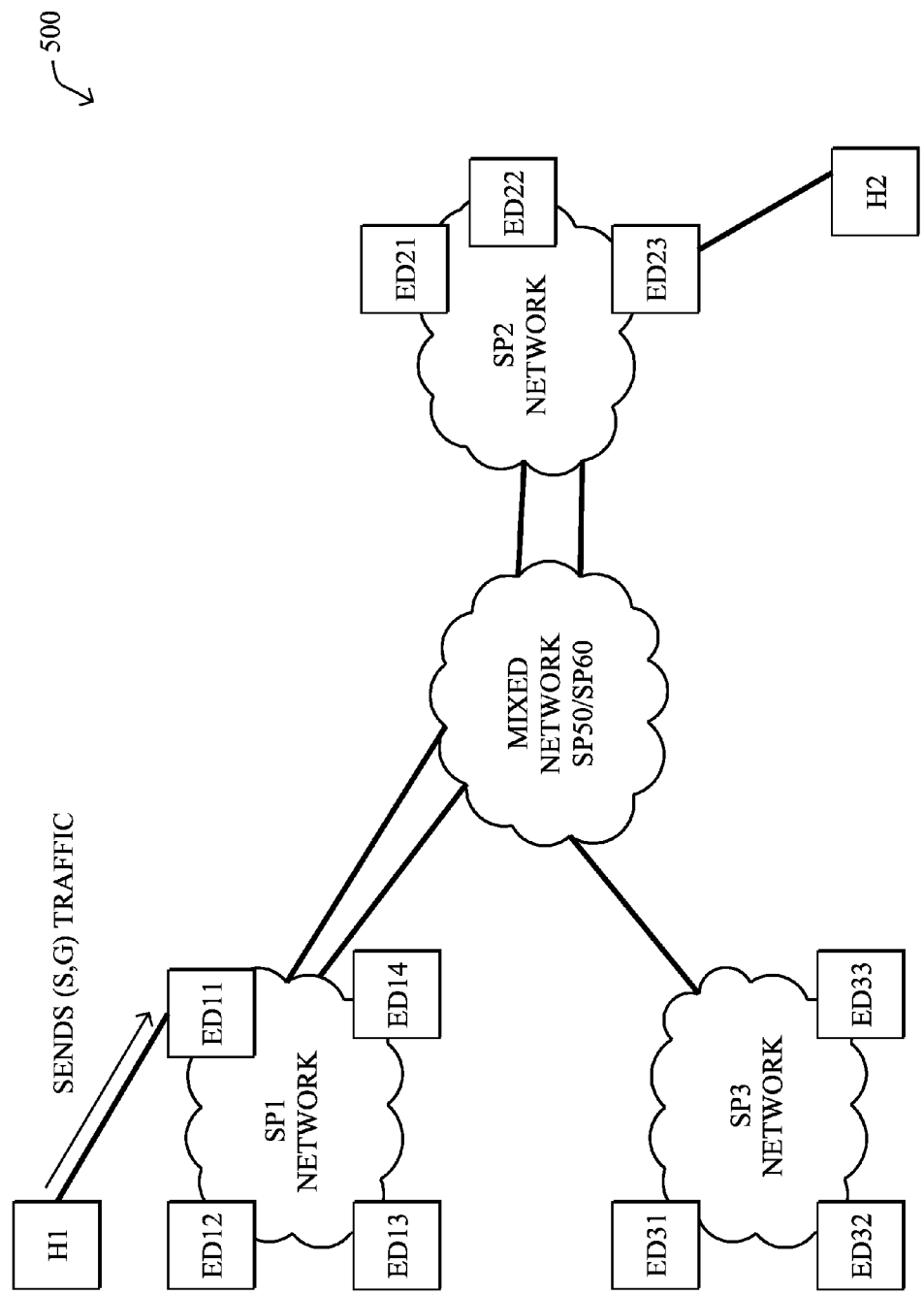
Figure 5E:
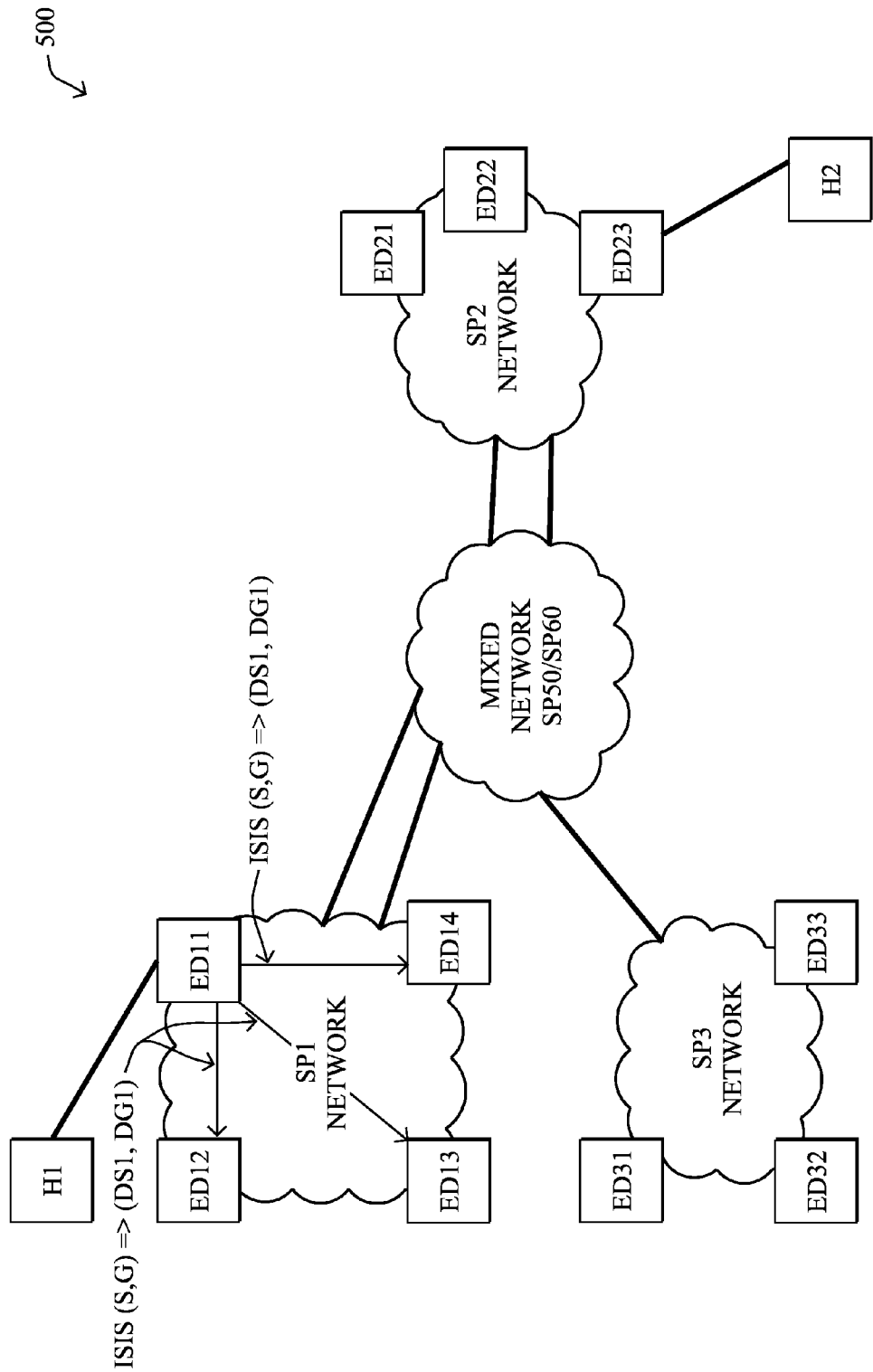
Figure 5F:
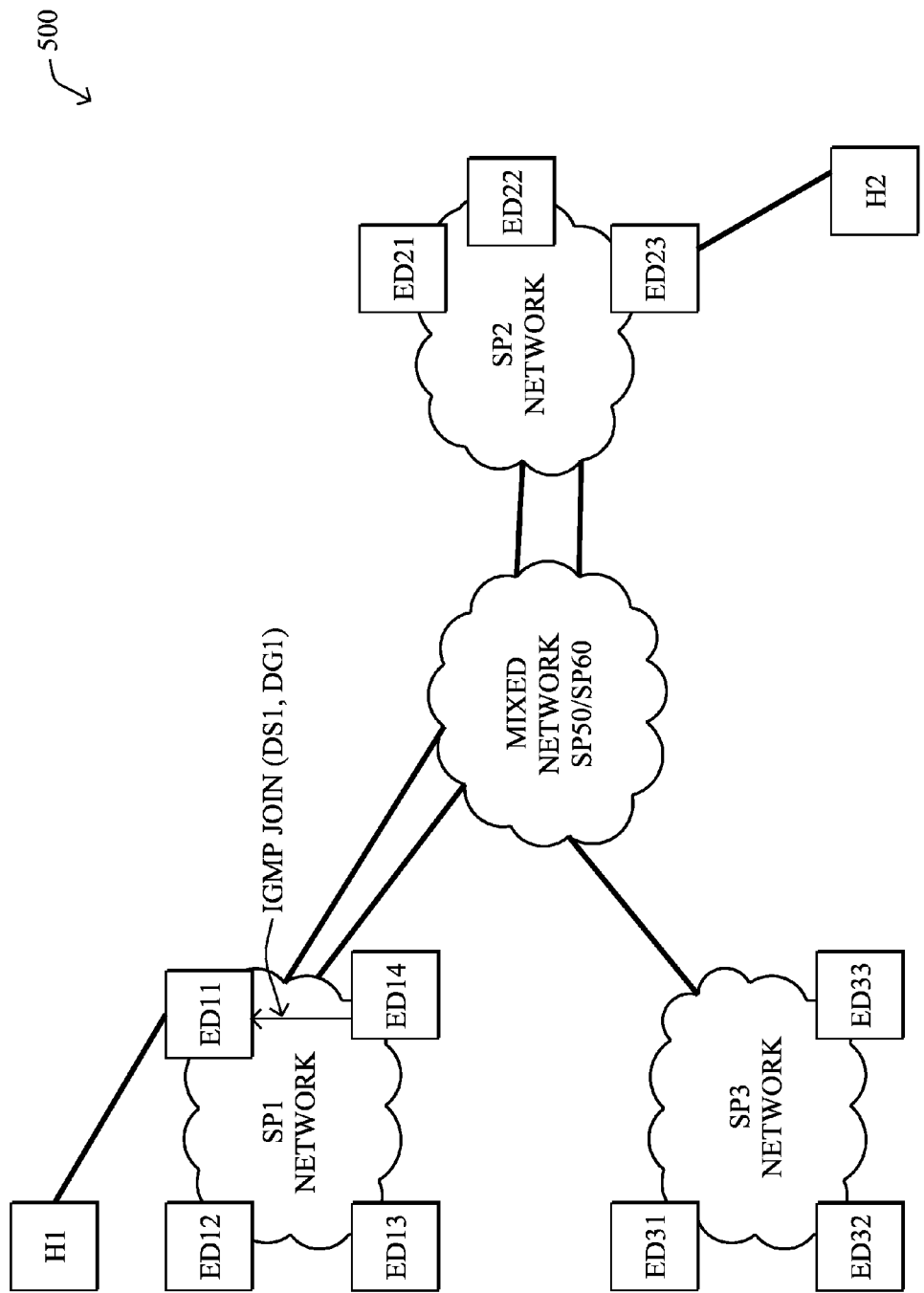
Figure 5G:
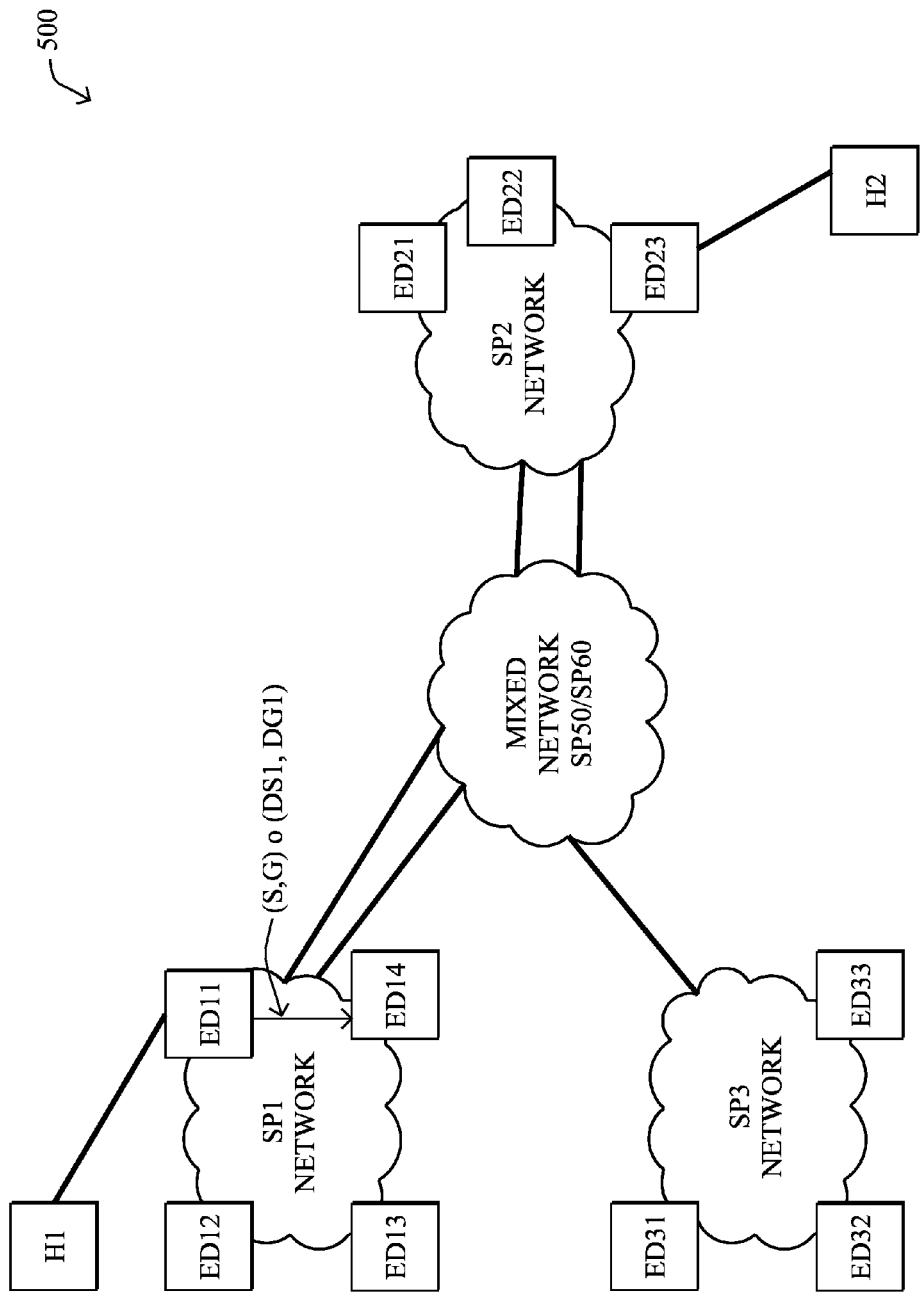

FIGS. 5D-5G illustrate multicasting a message, which originates at host device H1, from root device (e.g., ED11) to local network devices. For example, FIG. 5D illustrates device H1 sending (S, G) traffic to ED11. The message (S, G) typically arrives at ED11 via internet group management protocol snooping by ED11. FIG. 5E illustrates ED11 mapping the (S, G) message to (DS1, DG1) and announcing the mapping (e.g., (S, G)→(DS1, DG1)) via local multicast within local SP1 network (e.g., to devices ED12, ED13 and ED14). FIG. 5F illustrates ED14 joining the group (DS1, DG1) via IGMP since ED14 has listeners. FIG. 5G illustrates ED11 multicasting the message (S, G) over the (DS1, DG1) mapping to joined devices (e.g., ED14) within the local SP1 network.

Figure 5H:
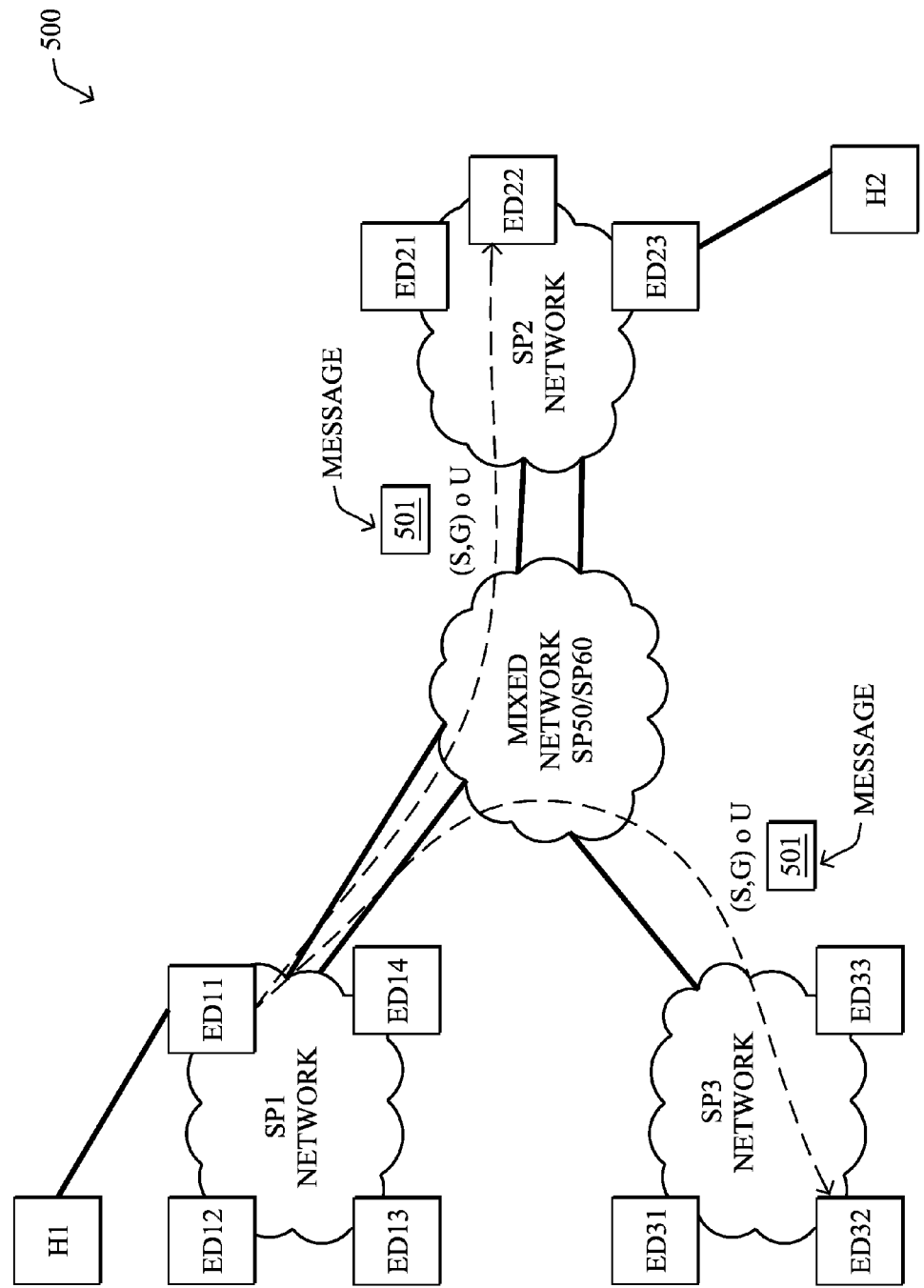

FIG. 5H illustrates unicasting a multicast message 501 across a non-multicast network (e.g., mixed network SP50/SP60). In particular, FIG. 5H illustrates ED11 unicasting a multicast message (e.g., message 501(S, G)oU) to ED22 in the SP2 network and to ED32 in the SP3 network. ED11 unicasts this multicast message according to a selected multicast distribution tree (MDT), which is determined from the multicast reachability database (MRDB) of ED11. In particular, ED11 encapsulates the multicast message as a unicast message 501 (e.g., "(S, G)oU") and transmits the unicast message to one or more relay devices (e.g., ED22, ED32), to cause the relay devices to decapsulate the unicast message to obtain the multicast message; re-encapsulate the multicast message as a relay-sourced multicast message, and multicast the relay-sourced multicast message to the one or more devices of the sub-network of the particular relay device.

Figure 5I:
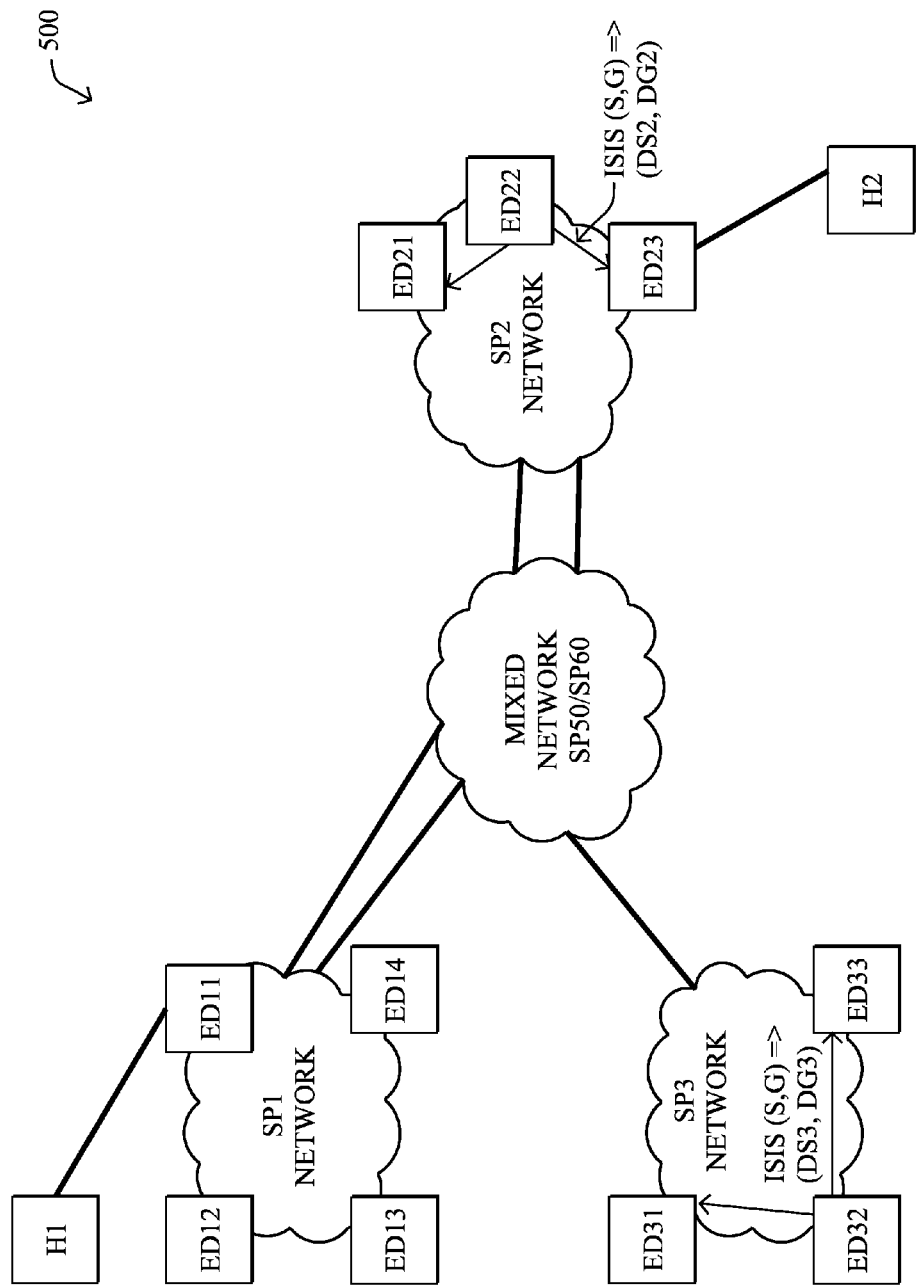
Figure 5J:
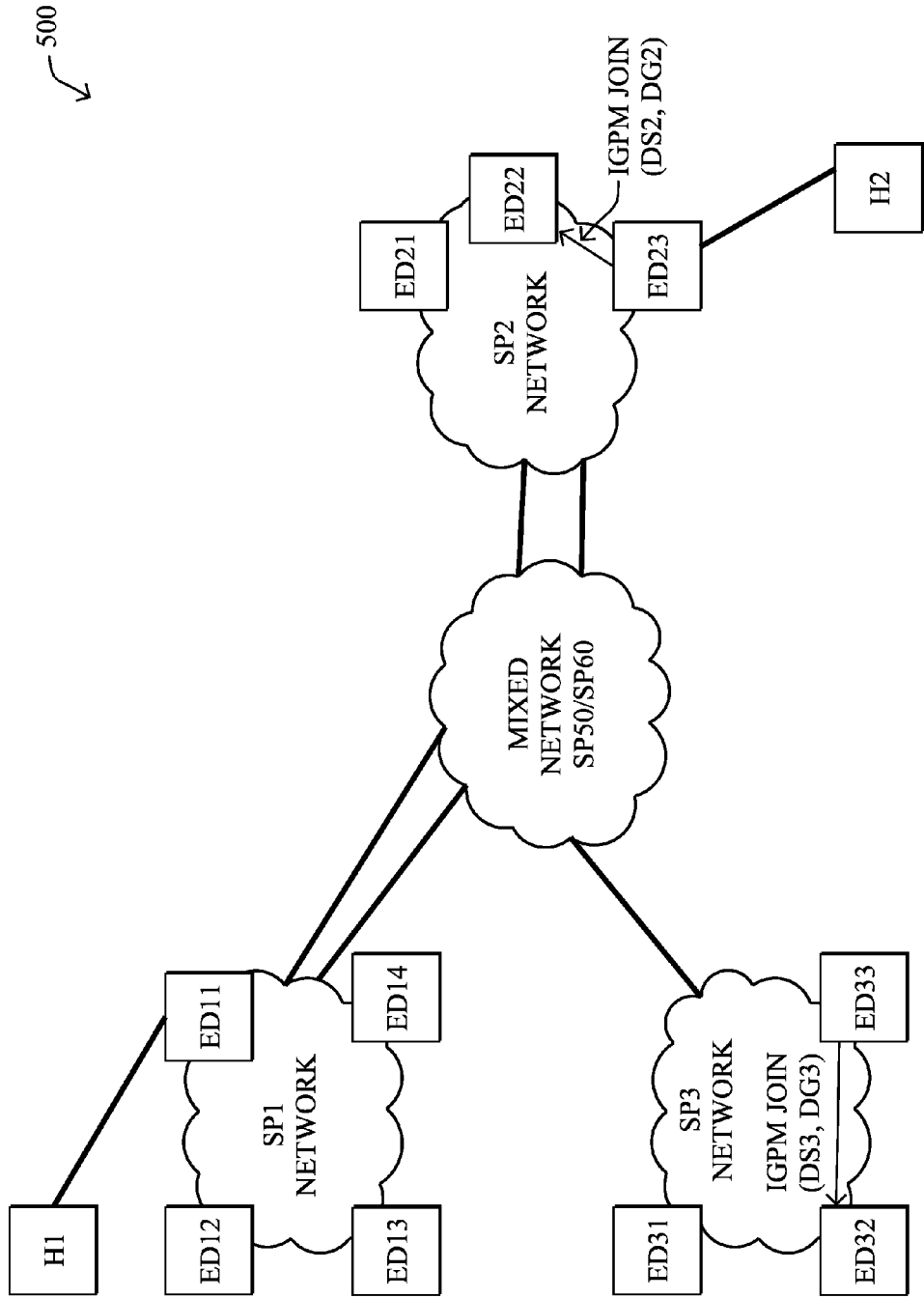
Figure 5K:
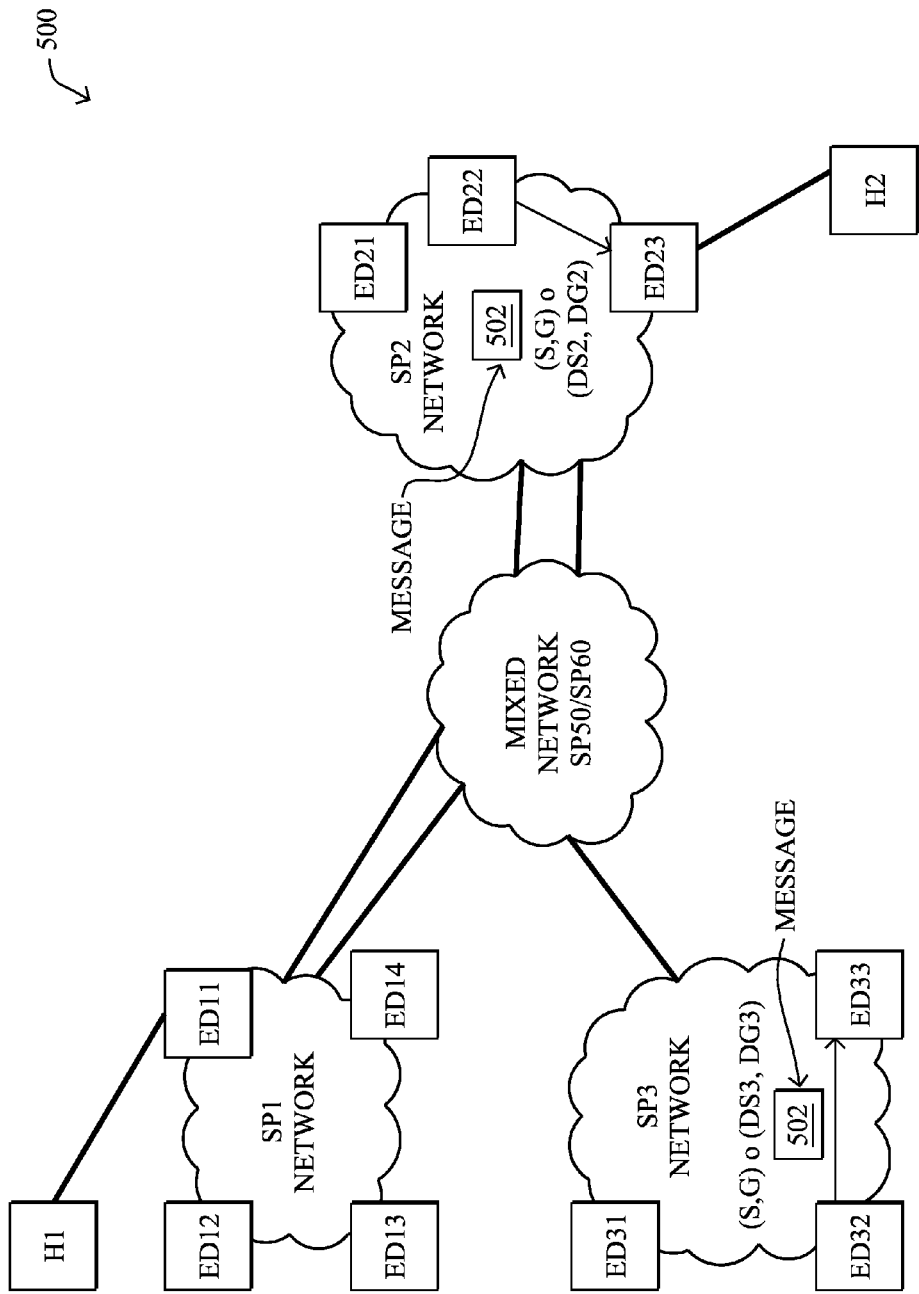

FIGS. 5I-5K, similar to FIGS. 5E-5G, illustrate multicasting a message, which was originally a unicast message encapsulating the multicast message, in local networks. For example, FIG. 5I illustrates ED22 and ED32 mapping the (S, G) message to (DS2, DG2) and (DS3, DG3), respectively, and announcing the mapping (e.g., (S, G)→(DSi, DGi)) via local multicast within respective local SPi network devices. FIG. 5J illustrates ED23 and ED33 joining respective groups (DSi, DGi) via IGMP. FIG. 5K illustrates ED22 and ED33 multicasting the message 502 (S, G) over the (DSi, DGi) mapping to joined devices (e.g., ED23 and ED33) within respective local SPi networks. In particular, ED22 and ED32 are relay devices with respect to source or root device, since each of ED22 and ED32 are reachable over only a non-multicast network. Further, both ED22 and ED32 are also connected to a sub-network of one or more devices (e.g., local network devices). When ED22 receives the unicast message (which encapsulates the multicast message) from ED11, ED22 (e.g., the relay device) decapsulates the unicast message to determine the multicast message (e.g., via any-source multicast (ASM) or a source-specific multicast (SSM)); re-encapsulate the multicast message as a relay-sourced multicast message (e.g., mapping the (S, G) message to (DSi, DGi); and multicast the relay-sourced multicast message to the one or more devices within the sub-network (e.g., ED21 and ED23). When ED22 re-encapsulates the multicast message (i.e., message 502) as a relay-sourced message, the ED22 replaces the root source address (e.g., the IP source address) of the multicast message with a relay source address of the relay device.

Figure 5L:
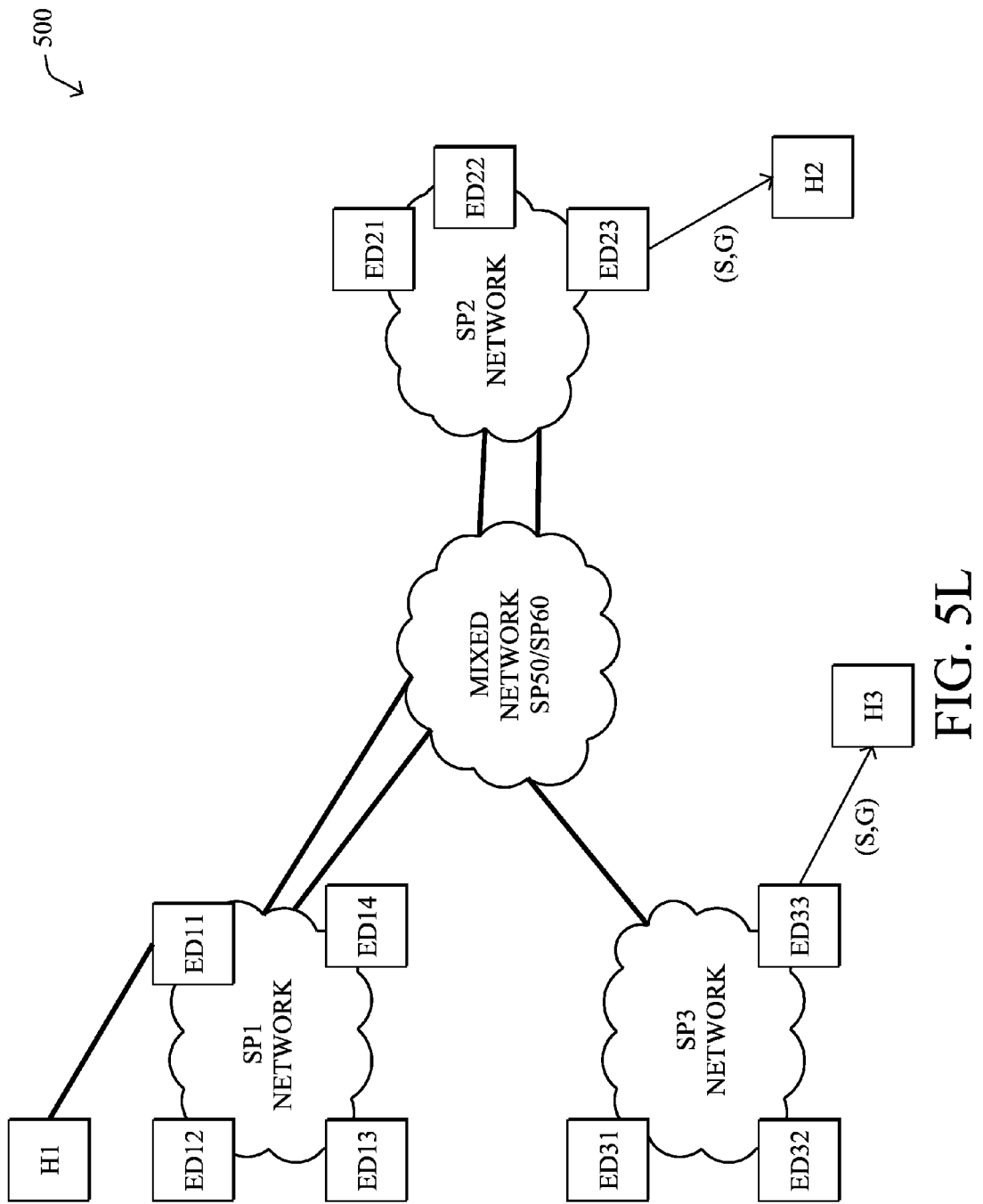

FIG. 5L illustrates destination devices (e.g., ED22 and ED32) decapsulating and forwarding the message to a local site listening devices or subscribers (e.g., device H2 and H3, respectively).

Collectively, with reference to FIGS. 5A-5J, ED11 is a root device that determines the relative reachability of one or more relay devices via only a non-multicast network (e.g., mixed network SP50/SP60). This relative reachability is stored as a multicast reachability database, which is further used to generate a multicast distribution tree (ref. FIGS. 4A-4C, discussed above). ED11 multicasts messages to interested local SP1 network devices and unicasts the multicast message to devices that are reachable only via non-multicast network(s) (e.g. ref FIG. 5H; ED32 and ED22). In particular, ED11 encapsulate the multicast message as a unicast message, and transmits the unicast message according to the multicast distribution tree. Notably, if any relay device has a local site listener device e.g., (FIG. 5L), the relay device decapsulates the unicast message to obtain the multicast message and send the multicast message to the local site listener device (e.g., device H2 and device H3).

FIGS. 5A-5L are arranged merely for illustration and certain other steps may be included or excluded as desired. While the discussion stepped through FIGS. 5A-5L in order, this order is merely illustrative, and any suitable arrangement of steps may be used without departing from the scope of the embodiments herein. For example, if ED22 previously receives (S, G) over unicast from ED11, and previously advertises (S, G)o(DS2, DG2) mapping (e.g., there is a (S, G) listener behind ED21), then ED23 receives this (S, G)o(DS2, DG2) mapping from ED22, and will join (DS2, DG2) to receive the traffic. In some embodiments, if ED22 previously receives (S, G) over unicast ((S,G)oU) from ED11, but does not yet advertise (S, G)o(DS2, DG2) mapping (e.g., there is only (S, G) listener behind ED22 itself), then ED22 initiates advertising (S, G)o(DS2, DG2) mapping upon receiving the (S, G) interest from ED23, since ED22 is aware that ED23 is in the same local multicast network (e.g., SP2 network). When ED23 receives this (S, G)o(DS2, DG2) mapping from ED22, ED23 joins (DS2, DG2) to receive the traffic. Further, ED11 does nothing upon receiving the (S, G) interest from ED23, since ED11 knows that ED23 is in the same multicast network as ED22. In additional embodiments, if ED22 does not receive (S, G) over unicast from ED11, ED11 sends (S, G) over unicast to ED23 upon receiving the (S, G) interest from ED23, since ED23 is the first remote ED in the multicast network of ED22.

In additional embodiments, if an relay device ceases interest in (S, G), and, assuming the relay device has no subsequent listeners, or additional interested devices in the sub-network, then the source device will cease the multicast over unicast communication to the relay device. The source device can cease transmission of multicast messages over unicast communication by changing the MDT in the source device. In other embodiments, the root or source device will continue multicast over unicast communication in anticipation of future (S, G) listeners for the relay device. The advantage of continuous multicast over unicast communication is no packet out-of-order delivery for subsequent listener devices.

Note that a new optional ISIS type-length-value (TLV) may be added to transmitted packets in order to support the techniques herein for OTV networks. In particular, an ISIS origin ED TLV may be used to identify the original generator of the ISIS packet. When the ISIS packet is relayed by a relay ED via multicast, the IP source address in the IP header is not the original ED. Since the original ED for this ISIS packet is generally needed in such case, i.e., to learn the MAC reachability info, this TLV is used for optimal ISIS control packets delivery. If this TLV is not introduced, then the ISIS packets can only be delivered via unicast to those unicast-reachable remote EDs, but the data packets can still be delivered optimally.

In addition, a VPN-ID TLV may be used to differentiate different VPNs. That is, if the VPN-ID TLV is introduced, then the configured control group pMG need not be used as a global VPN identifier any more. As a result, pMG could be different in different multicast domains. This TLV may be required for use between ED and an adjacency server, while optionally used in the ISIS packet among EDs. Note also that this TLV may be used to avoid double IP header encapsulation of ISIS packets on the unicast tunnel: if the VPN-ID TLV is included in ISIS packet, then one unicast IP header is sufficient. In this manner, ISIS packets will have the same encapsulation as broadcast data packets. Notably, if all EDs are assumed to use the same control-group address pMG (which may often be the case), then this VPN-ID TLV is not needed.

Furthermore, another TLV, such as a modified/enhanced (S,G)=>(DS,DG) active source TLV, may be used to include the source ED information. For instance, one more fields (or sub-TLVs) may be added to this TLV, such as a multicast source ED to indicate where the multicast data source S is located. This is generally only used/necessary in some special cases, such as multicast source move, etc.

Figure 6:
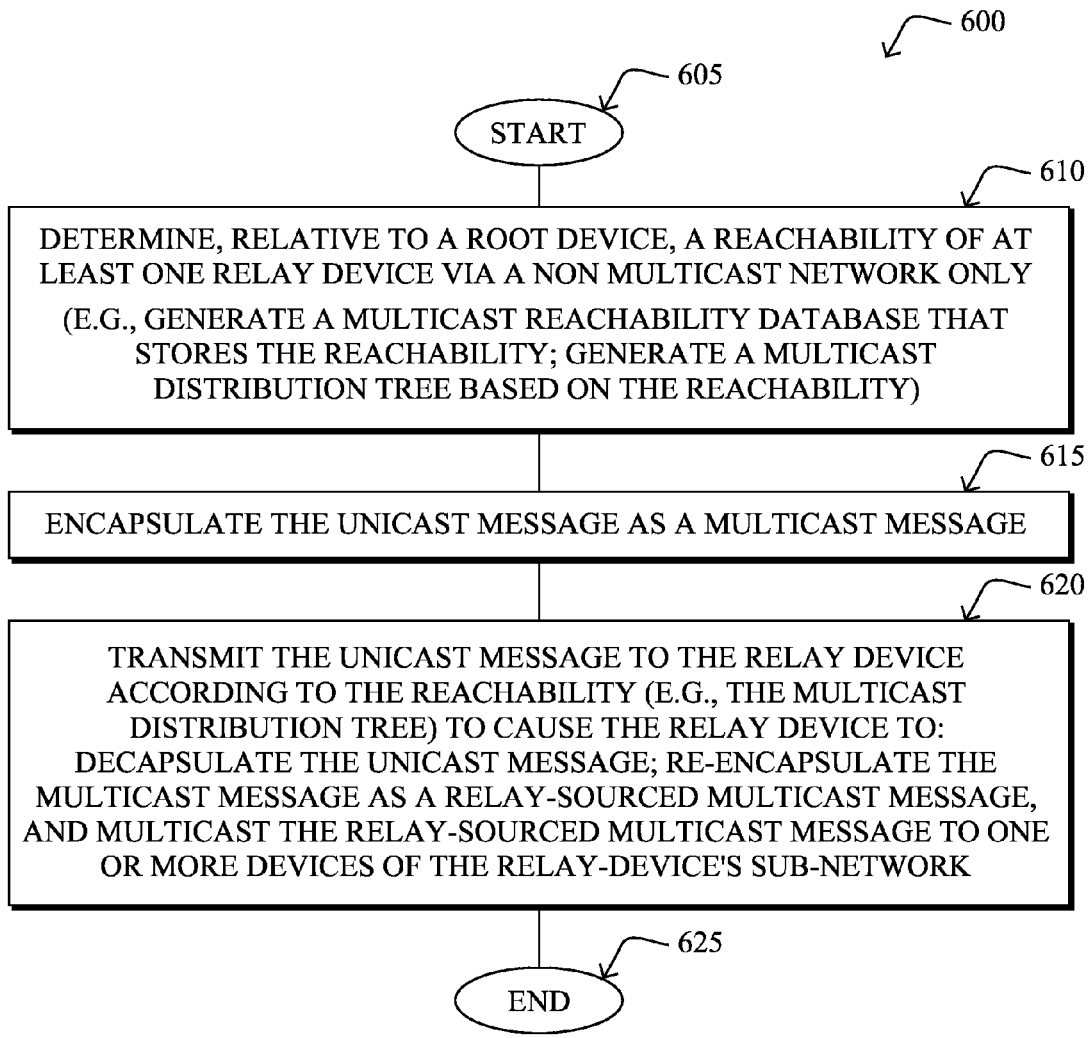
FIG. 6 illustrates an example simplified procedure for communicating multicast messages over a non-multicast network from the perspective of a root or source device.

FIG. 6 illustrates an example simplified procedure for communicating multicast messages over a non-multicast network in accordance with one or more embodiments described herein, particularly from the perspective of a root or source device. The procedure 600 starts at step 605, and continues to step 610, where, as described in greater detail above, the root device (e.g., ED11 above) determines a reachability of at least one relay device (e.g., ED22) via a non-multicast network only. As mentioned above, in step 610 the source device may generate a multicast reachability database (MRDB) that stores the reachability, and then may generate a multicast distribution tree (MDT) based on the reachability. In step 615, the source device encapsulates the unicast message 501 as a multicast message 502, and in step 620 transmits the unicast message to the relay device according to the reachability (e.g., the MDT) to cause the relay device to: decapsulate the unicast message; re-encapsulate the multicast message as a relay-sourced multicast message, and multicast the relay-sourced multicast message to one or more devices of the relay-device's sub-network. The procedure 600 may subsequently end in step 625, or, may return to step 605 to update the MRDB and/or MDT, or else to step 615 to continue forwarding multicast messages, accordingly.

Figure 7:
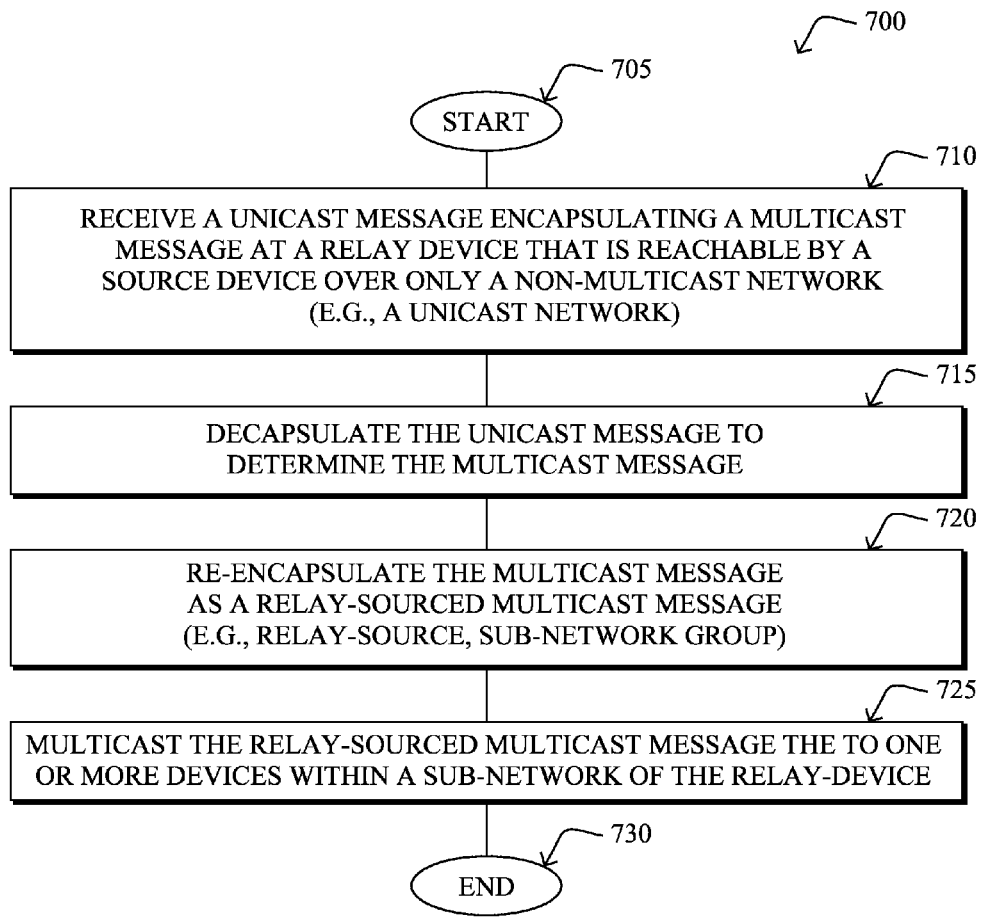
FIG. 7 illustrates an example simplified procedure for communicating multicast messages over a non-multicast network from the perspective of a relay device.

FIG. 7 illustrates an example simplified procedure 700 for communicating multicast messages over a non-multicast network in accordance with one or more embodiments described herein, particularly from the perspective of a relay device. The procedure 700 starts at step 705, and continues to step 710, where, as described in greater detail above, a relay device (e.g., ED22) receives a unicast message 501 encapsulating a multicast message 502. As described above, the relay device is reachable by a source device (e.g., ED11) over only a non-multicast network (e.g., a unicast network SP60). In step 715, the relay device may then decapsulate the unicast message to determine the multicast message and re-encapsulates the multicast message as a relay-sourced multicast message (e.g., DSi, DGi) in step 720. In step 725, the relay device multicasts the relay-sourced multicast message to the one or more devices within a sub-network of devices, which communicate with the relay device. The procedure 700 may subsequently end in step 730, or, may restart at step 705 to receive further messages.

It should be noted that while certain steps within procedures 600-700 may be optional as described above, the steps shown in FIGS. 6-7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 600-700 are described separately, certain steps from each procedure may be incorporated into each other procedure, and the procedures are not meant to be mutually exclusive.

The techniques described herein, therefore, provide for optimizing communication of multicast messages over non-multicast networks. In particular, the techniques herein communicate multicast messages as unicast messages and optimize such communication via encapsulating a multicast message in a unicast message by a source device, thus alleviating the use of separate unicast messages to reach destinations across non-multicast networks. Notably, the techniques are deployable for current systems since there is no data encapsulation format changes, and are straightforward for customer configuration and use.

While there have been shown and described illustrative embodiments that provide for communicating multicast messages over non-multicast, it is to be understood that various other adaptations and modifications may be made within the spirit and scope of the embodiments herein. For example, the embodiments have been shown and described herein with relation to particular networks and network protocols (e.g., OTV networks). However, the embodiments in their broader sense are not as limited, and may, in fact, be used with other types of networks and/or protocols. In addition, while the techniques generally describe initiation and determinations by a relay device or a source device, there may be multiple relay devices and multiple source devices each performing independent determinations. Also, the above embodiments are compatible with various virtual networks. For example, each encapsulated message can contain an overlay transport virtualization OTV instance, a virtual local area network (VLAN), a virtual private network (VPN), multi-protocol label switching (MPLS) networks, data center interconnect (DCI) networks, etc.

For example, with respect to encapsulation for VPN communication, the source device can encapsulate and send multicast messages over unicast by performing a lookup to identify a pMG of the relay device. Then the source device can encapsulate the multicast message using a double IP header encapsulation. In this fashion, the relay device can still use a pMG to identify a VPN to which the message is assigned. Alternatively, the encapsulation can remove the IP multicast header, but include a VPN-identification in the message. If this encapsulation is used, the relay device identifies the VPN by the VPN-identification.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:

receiving a unicast message that encapsulates a multicast message at a relay device that is reachable by a source device over only a non-multicast network, wherein the unicast message comprises a root source address of a root node, and the relay device is connected to a sub-network of one or more devices;

decapsulating, at the relay device, the unicast message to determine the multicast message;

re-encapsulating, at the relay device, the multicast message as a relay-sourced multicast message, wherein re-encapsulating the multicast message as a relay-sourced multicast message comprises replacing the root source address with a relay source address of the relay device; and multicasting, from the relay device, the relay-sourced multicast message to the one or more devices within the sub-network.

2. The method of claim 1, wherein the non-multicast network is a unicast network.

3. The method of claim 1, wherein the relay-sourced multicast message is multicast via at least one of an any-source multicast (ASM) or a specific source multicast (SSM).

4. The method of claim 1, wherein the relay device is an Overlay Transport Virtualization (OTV) edge device.

5. The method of claim 1, wherein the relay device is at least one of a virtual machine or an edge computing device.

6. An apparatus, comprising:

one or more network interfaces adapted to communicate as a relay-device in a sub-network of one or more devices, wherein the sub-network is reachable by a source device over only a non-multicast network;

a processor coupled to the one or more network interfaces and adapted to execute one or more processes; and a memory configured to store a process executable by the processor, the process when executed operable to:

receive a unicast message that encapsulates a multicast message wherein the unicast message comprises a root source address of a root node, decapsulate the unicast message to determine the multicast message, re-encapsulate the multicast message as a relay-sourced multicast message, wherein when the relay device re-encapsulates the multicast message as a relay-sourced multicast message, the relay device replaces the root source address with a relay source address of the apparatus, and multicast the relay-sourced multicast message to the one or more devices within the sub-network.

7. The apparatus of claim 6, wherein the relay-sourced multicast message is multicast via at least one of an any-source multicast (ASM) or a specific source multicast (SSM).

8. The apparatus of claim 6, wherein the relay device is at least one of a virtual machine or an edge computing device.

* * * * *